US012682025B2

(12) United States Patent (10) Patent No.: US 12,682,025 B2
Petro et al. (45) Date of Patent: Jul. 14, 2026

(54) METHODS AND APPARATUS TO CREDIT UNIDENTIFIED MEDIA

(71) Applicant: The Nielsen Company (US), LLC, New York, NY (US)

(72) Inventors: James Petro, Dunedin, FL (US); Daniel Nelson, Tampa, FL (US); Raghuram Ranganathan, Tampa, FL (US); Sandeep Tapse, Oldsmar, FL (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

(21) Appl. No.: 19/019,847

(22) Filed: Jan. 14, 2025

(65) Prior Publication Data
US 2025/0156508 A1 May 15, 2025

Related U.S. Application Data

(63) Continuation of application No. 17/408,174, filed on Aug. 20, 2021, now Pat. No. 12,271,449.

(60) Provisional application No. 63/217,060, filed on Jun. 30, 2021.

(51) Int. Cl.
*H04N 21/43* (2011.01)
*G06F 16/435* (2019.01)
*G06F 21/16* (2013.01)

(52) U.S. Cl.
CPC ............ *G06F 21/16* (2013.01); *G06F 16/435* (2019.01); *H04N 21/43* (2013.01)

(58) Field of Classification Search
CPC ........ H04N 21/43; G06F 21/16; G06F 16/435
See application file for complete search history.

(56) References Cited

U.S. PATENT DOCUMENTS

| | | | | |
|---|---|---|---|---|
| 8,918,802 B2 * | 12/2014 | Ramaswamy | ......... | G06Q 30/02 |
| | | | | 725/18 |
| 10,863,236 B2 * | 12/2020 | Petro | ................ | H04N 21/23418 |
| 12,075,117 B2 | 8/2024 | Topchy et al. | | |
| 2015/0193813 A1 * | 7/2015 | Toupet | .............. | G06Q 30/0242 |
| | | | | 705/14.41 |

(Continued)

OTHER PUBLICATIONS

United States Patent and Trademark Office, "Non-Final Office Action," Issued in connection with U.S. Appl. No. 18/800,414, mailed on Aug. 8, 2025, 08 pages.

*Primary Examiner* — Mulugeta Mengesha

(57) ABSTRACT

Methods, apparatus, systems and articles of manufacture to credit unidentified media are disclosed. Disclosed example apparatus include a database updater to store a first group of signatures representative of unidentified media in a database, the first group of signatures obtained from a first media meter to monitor a first media presentation device, the first group of signatures associated with a first media exposure category based on media source information reported by the first media meter. Disclosed example apparatus also include a media comparator to compare a second group of signatures with the first group of signatures, the second group of signatures obtained from a second media meter to monitor a second media presentation device. Disclosed example apparatus further include a reporter to credit media exposure represented by the second group of signatures to the first media exposure category when the second group of signatures matches the first group of signatures.

20 Claims, 13 Drawing Sheets

(56)          References Cited

U.S. PATENT DOCUMENTS

2017/0142472 A1*   5/2017   Raesig ................... H04L 67/60
2018/0191850 A1*   7/2018   Tapse ................... H04L 67/535

* cited by examiner

FROM
SOURCE
DETECTION
METERS

FROM
NON-SOURCE
DETECTION
METERS

AUDIENCE MEASUREMENT SERVICE 190

REFERENCE
SIGNATURE
DATABASE 306

SOURCE
DETECTION
CREDITOR 302

DATABASE
UPDATER
312

AOT MONITORED
SIGNATURE
DATABASE 308

NON-SOURCE
DETECTION
CREDITOR 304

AOT
COMPARATOR
402

REPORTER 310

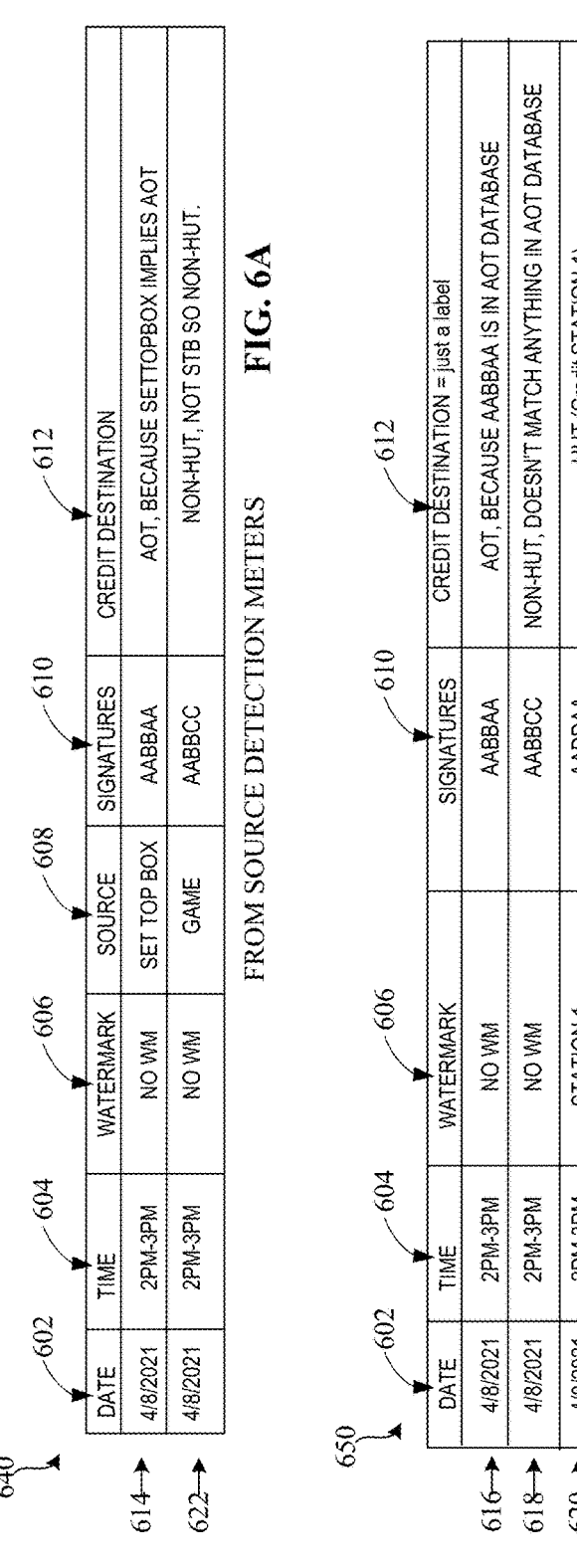

| DATE | TIME | WATERMARK | SOURCE | SIGNATURES | CREDIT DESTINATION |
|------|------|-----------|--------|------------|--------------------|
| 4/8/2021 | 2PM-3PM | NO WM | SET TOP BOX | AABBAA | AOT, BECAUSE SETTOPBOX IMPLIES AOT |
| 4/8/2021 | 2PM-3PM | NO WM | GAME | AABBCC | NON-HUT, NOT STB SO NON-HUT. |

FROM SOURCE DETECTION METERS    FIG. 6A

| DATE | TIME | WATERMARK | SIGNATURES | CREDIT DESTINATION = just a label |
|------|------|-----------|------------|----------------------------------|
| 4/8/2021 | 2PM-3PM | NO WM | AABBAA | AOT, BECAUSE AABBAA IS IN AOT DATABASE |
| 4/8/2021 | 2PM-3PM | NO WM | AABBCC | NON-HUT, DOESN'T MATCH ANYTHING IN AOT DATABASE |
| 4/8/2021 | 2PM-3PM | STATION 1 | AADDAA | HUT (Credit STATION 1) |

FROM NON- SOURCE DETECTION METERS    FIG. 6B

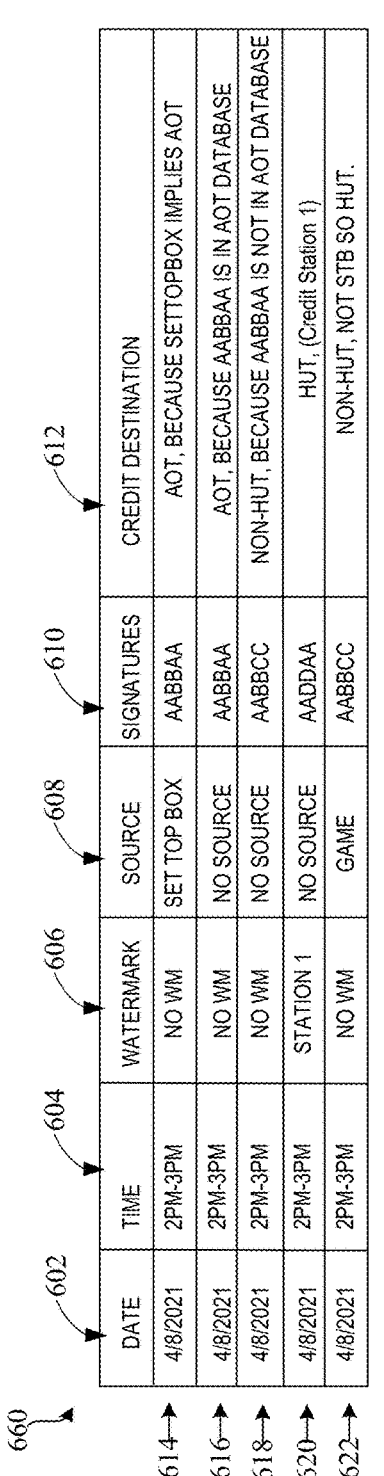

| DATE | TIME | WATERMARK | SOURCE | SIGNATURES | CREDIT DESTINATION |
|------|------|-----------|--------|------------|--------------------|
| 4/8/2021 | 2PM-3PM | NO WM | SET TOP BOX | AABBAA | AOT, BECAUSE SETTOPBOX IMPLIES AOT |
| 4/8/2021 | 2PM-3PM | NO WM | NO SOURCE | AABBAA | AOT, BECAUSE AABBAA IS IN AOT DATABASE |
| 4/8/2021 | 2PM-3PM | NO WM | NO SOURCE | AABBCC | NON-HUT, BECAUSE AABBAA IS NOT IN AOT DATABASE |
| 4/8/2021 | 2PM-3PM | STATION 1 | NO SOURCE | AADDAA | HUT, (Credit Station 1) |
| 4/8/2021 | 2PM-3PM | NO WM | GAME | AABBCC | NON-HUT, NOT STB SO HUT. |

FIG. 6C

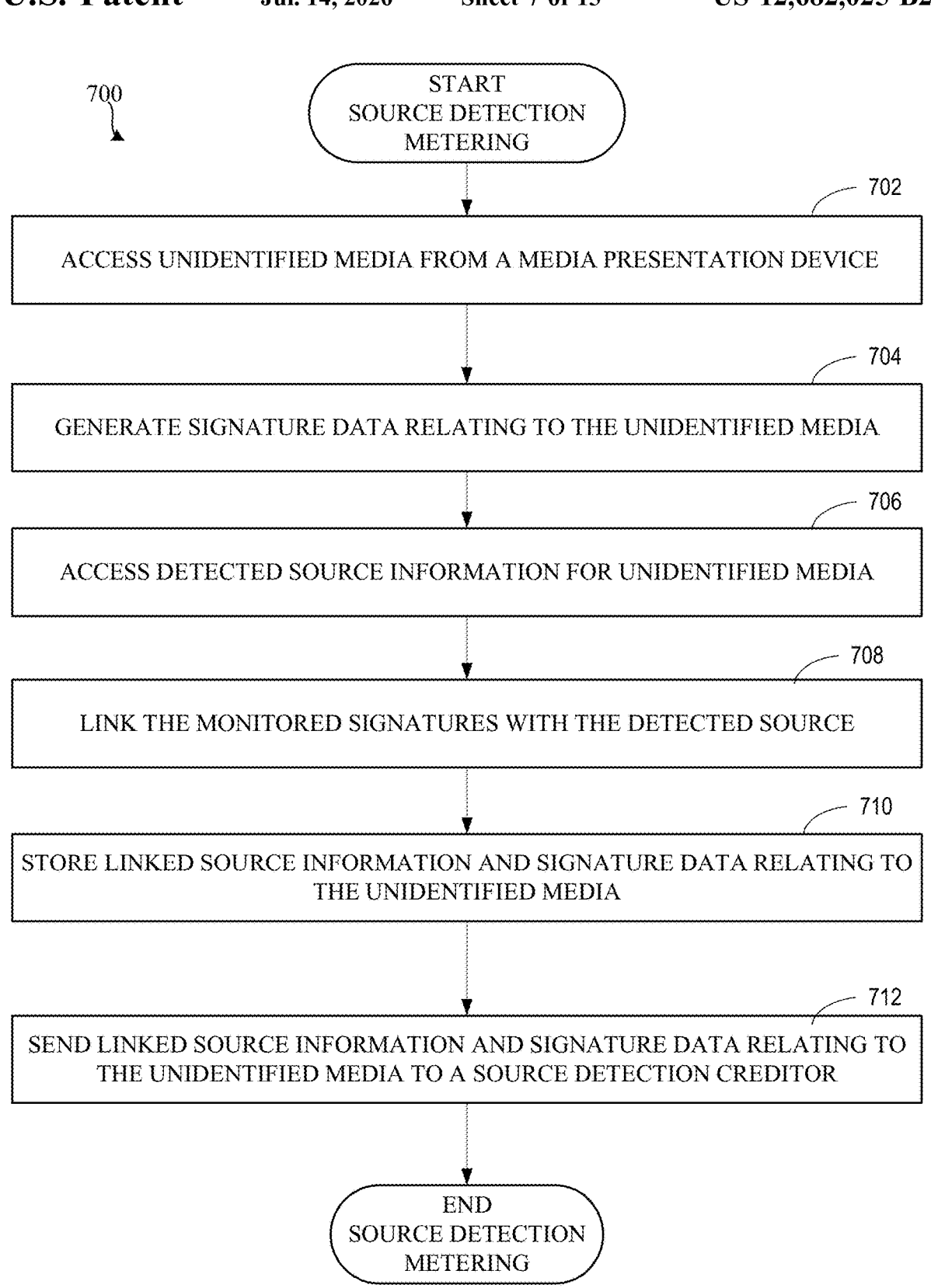

700

START
SOURCE DETECTION
METERING

702

ACCESS UNIDENTIFIED MEDIA FROM A MEDIA PRESENTATION DEVICE

704

GENERATE SIGNATURE DATA RELATING TO THE UNIDENTIFIED MEDIA

706

ACCESS DETECTED SOURCE INFORMATION FOR UNIDENTIFIED MEDIA

708

LINK THE MONITORED SIGNATURES WITH THE DETECTED SOURCE

710

STORE LINKED SOURCE INFORMATION AND SIGNATURE DATA RELATING TO
THE UNIDENTIFIED MEDIA

712

SEND LINKED SOURCE INFORMATION AND SIGNATURE DATA RELATING TO
THE UNIDENTIFIED MEDIA TO A SOURCE DETECTION CREDITOR

END
SOURCE DETECTION
METERING

START NON-SOURCE
DETECTION
METERING

902

ACCESS UNIDENTIFIED MEDIA FROM A MEDIA PRESENTATION DEVICE

904

GENERATE SIGNATURE DATA RELATING TO THE UNIDENTIFIED MEDIA

906

STORE SIGNATURE DATA RELATING TO THE UNIDENTIFIED MEDIA

908

SEND SIGNATURE DATA RELATING TO THE UNIDENTIFIED MEDIA TO A
NON-SOURCE DETECTION CREDITOR

END NON-SOURCE
DETECTION
METERING

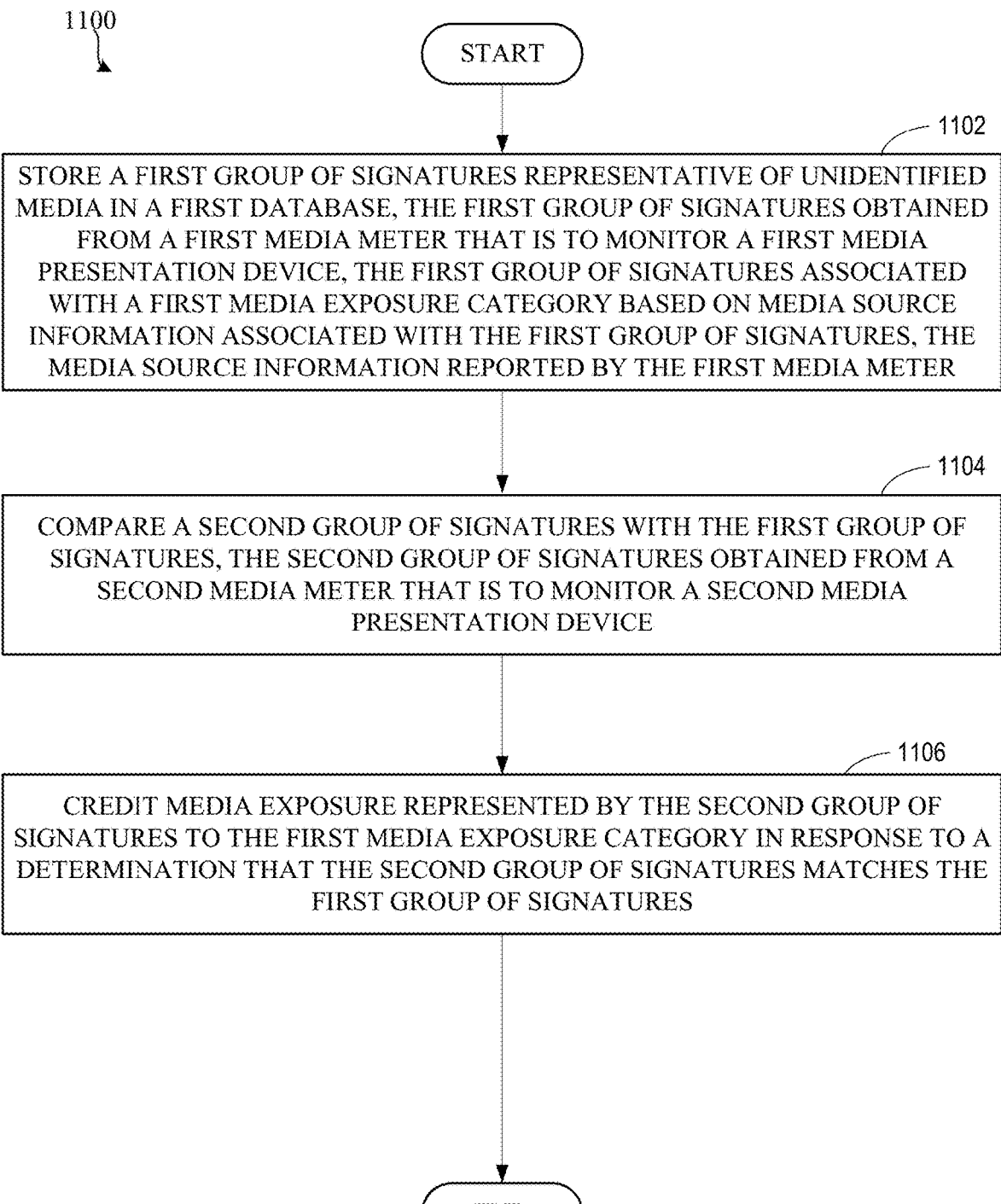

1100

START

1102

STORE A FIRST GROUP OF SIGNATURES REPRESENTATIVE OF UNIDENTIFIED MEDIA IN A FIRST DATABASE, THE FIRST GROUP OF SIGNATURES OBTAINED FROM A FIRST MEDIA METER THAT IS TO MONITOR A FIRST MEDIA PRESENTATION DEVICE, THE FIRST GROUP OF SIGNATURES ASSOCIATED WITH A FIRST MEDIA EXPOSURE CATEGORY BASED ON MEDIA SOURCE INFORMATION ASSOCIATED WITH THE FIRST GROUP OF SIGNATURES, THE MEDIA SOURCE INFORMATION REPORTED BY THE FIRST MEDIA METER

1104

COMPARE A SECOND GROUP OF SIGNATURES WITH THE FIRST GROUP OF SIGNATURES, THE SECOND GROUP OF SIGNATURES OBTAINED FROM A SECOND MEDIA METER THAT IS TO MONITOR A SECOND MEDIA PRESENTATION DEVICE

1106

CREDIT MEDIA EXPOSURE REPRESENTED BY THE SECOND GROUP OF SIGNATURES TO THE FIRST MEDIA EXPOSURE CATEGORY IN RESPONSE TO A DETERMINATION THAT THE SECOND GROUP OF SIGNATURES MATCHES THE FIRST GROUP OF SIGNATURES

END

FIG. 11

METHODS AND APPARATUS TO CREDIT UNIDENTIFIED MEDIA

CROSS REFERENCE TO RELATED APPLICATIONS

This is a continuation of U.S. patent application No. 17,408,174, now U.S. Pat. No. 12,271,449, filed Aug. 20, 2021, which claims the benefit of U.S. Provisional Patent Application No. 63/217,060, filed Jun. 30, 2021, each of which is hereby incorporated herein by reference in its entirety.

FIELD OF THE DISCLOSURE

This disclosure relates generally to media monitoring, and, more particularly, to methods and apparatus to credit unknown media.

BACKGROUND

Monitoring companies desire knowledge on how users interact with media devices, such as smartphones, tablets, laptops, smart televisions, etc. To facilitate such monitoring, monitoring companies enlist panelists and install meters at the media presentation locations of those panelists. The meters monitor media presentations and transmit media monitoring information to a central facility of the monitoring company. Such media monitoring information enables the media monitoring companies to, among other things, monitor exposure to advertisements, determine advertisement effectiveness, determine user behavior, identify purchasing behavior associated with various demographics, etc.

BRIEF DESCRIPTION OF THE DRAWINGS

FIGS. 6A-6C are a visual representation of example media crediting data (e.g., media information, database file, media information file, media file, etc.) that may be generated by the example source detection meter and/or the non-source detection meter of FIG. 2.

FIG. 7 is a flowchart representative of example machine readable instructions which may be executed to implement the source detection meter of FIG. 2.

FIG. 11 is a flowchart representative of example machine readable instructions which may be executed to implement the example audience measurement service of FIG. 2 to utilize source detection meters and non-source detection meters to credit unknown media feeds.

Figure 1:
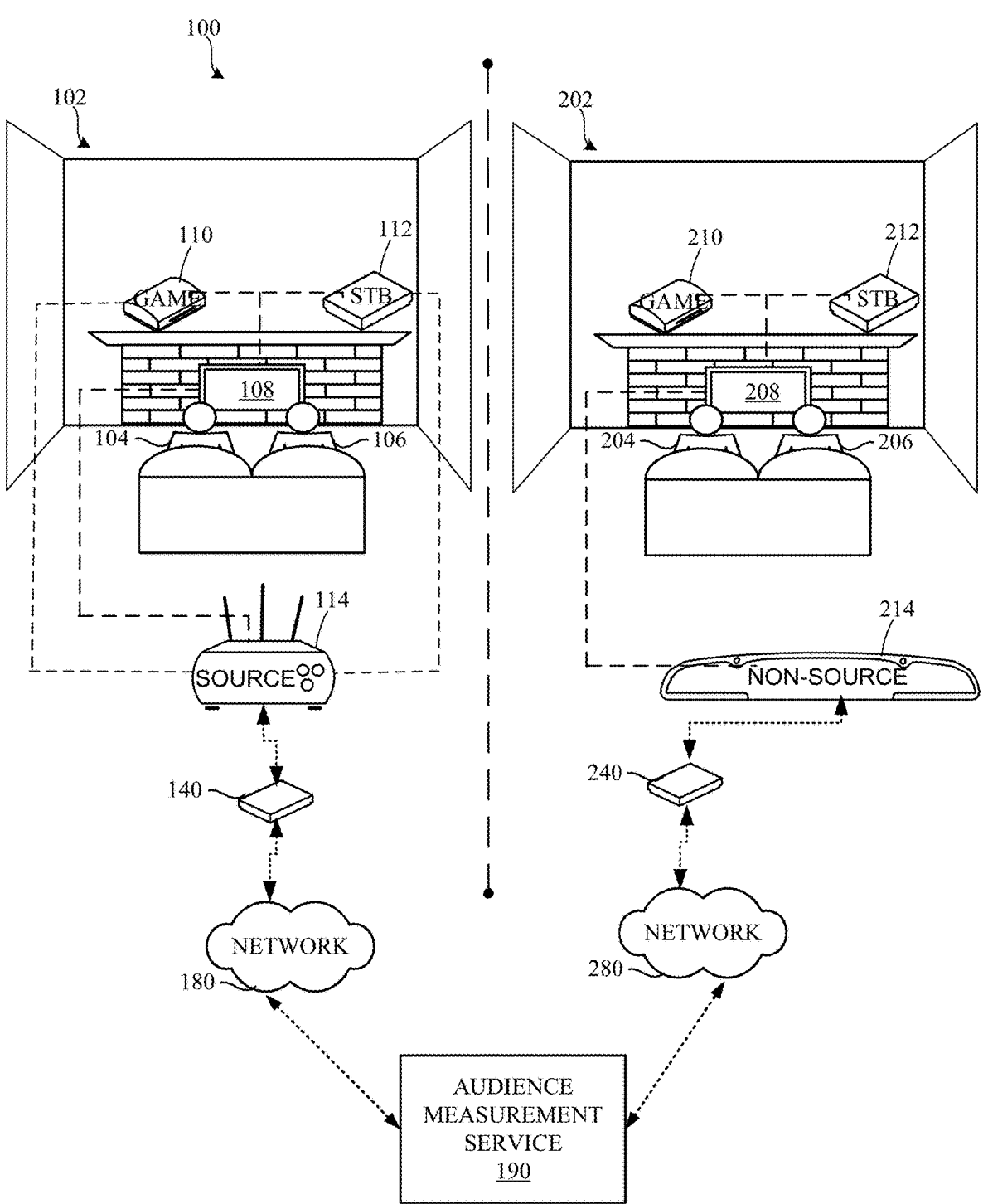
FIG. 1 illustrates an example environment in which unknown media feeds are credited utilizing a source detection meter and a non-source detection meter in accordance with teachings of this disclosure.

The figures are not to scale. In general, the same reference numbers will be used throughout the drawing(s) and accompanying written description to refer to the same or like parts. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. Stating that any part is in contact with another part means that there is no intermediate part between the two parts. Although the figures show layers and regions with clean lines and boundaries, some or all of these lines and/or boundaries may be idealized. In reality, the boundaries and/or lines may be unobservable, blended, and/or irregular.

Descriptors "first," "second," "third," etc. are used herein when identifying multiple elements or components which may be referred to separately. Unless otherwise specified or understood based on their context of use, such descriptors are not intended to impute any meaning of priority or ordering in time but merely as labels for referring to multiple elements or components separately for case of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

In measuring media ratings, certain media (e.g., advertisements, television shows, movies, or any other type of broadcasting content) is distributed by broadcast sources that encode the media with watermarks using one or more audio watermarking techniques. Audio watermarking is a technique used to identify media such as television broadcasts, radio broadcasts, advertisements (television and/or radio), downloaded media, streaming media, prepackaged media, etc. Existing audio watermarking techniques identify media by embedding one or more audio codes (e.g., one or more watermarks), such as media identifying information and/or an identifier that may be mapped to media identifying information, into an audio and/or video component. In some examples, the audio or video component is selected to have a signal characteristic sufficient to hide the watermark. As used herein, the terms "code" or "watermark" are used interchangeably and are defined to mean any identification information (e.g., an identifier) that may be inserted or embedded in the audio or video of media (e.g., a program or advertisement) for the purpose of identifying the media or for another purpose such as tuning (e.g., a packet identifying header).

As used herein "media" refers to audio and/or visual (still or moving) content and/or advertisements. For example, as used herein, the term "media" includes any type of content and/or advertisement delivered via any type of distribution medium. Thus, media includes television programming or advertisements, radio programming or advertisements, movies, web sites, streaming media, etc.

In some examples, to identify watermarked media, the watermark(s) are extracted and used to access a table of reference watermarks that are mapped to media identifying information. In some examples, signatures may be utilized for identifying information. Unlike media monitoring techniques based on codes and/or watermarks included with and/or embedded in the monitored media, fingerprint or signature-based media monitoring techniques generally use one or more inherent characteristics of the monitored media during a monitoring time interval to generate a substantially unique proxy for the media. Such a proxy is referred to as a signature or fingerprint, and can take any form (e.g., a series of digital values, a waveform, etc.) representative of any aspect(s) of the media signal(s) (e.g., the audio and/or video signals forming the media presentation being monitored). A signature may be a series of signatures collected in series over a time interval. A good signature is approximately repeatable when processing the same media presentation, but has at least some unique characteristics relative to other (e.g., different) presentations of other (e.g., different) media. Accordingly, the term "fingerprint" and "signature" are used interchangeably herein and are defined herein to mean a proxy for identifying media that is generated from one or more inherent characteristics of the media.

Signature-based media monitoring generally involves determining (e.g., generating and/or collecting) signature(s) representative of a media signal (e.g., an audio signal and/or a video signal) output by a monitored media device and comparing the monitored signature(s) to one or more references signatures corresponding to known (e.g., reference) media sources. Various comparison criteria, such as a cross-correlation value, a Hamming distance, etc., can be evaluated to determine whether a monitored signature matches a particular reference signature. When a match between the monitored signature and one of the reference signatures is found, the monitored media can be identified as corresponding to the particular reference media represented by the reference signature that with matched the monitored signature. Because attributes, such as an identifier of the media, a presentation time, a broadcast channel, etc., are collected for the reference signature, these attributes may then be associated with the monitored media whose monitored signature matched the reference signature. Example systems for identifying media based on codes and/or signatures are long known and were first disclosed in Thomas, U.S. Pat. No. 5,481,294, which is hereby incorporated by reference in its entirety.

The media measurement entity (e.g., audience measurement service, audience measurement entity, etc.) provides the service of accurately reporting television viewing behavior for individuals. The media measurement entity is to accurately report television viewing behavior for individuals by crediting exposure to a media exposure category. For example, if a first media presentation device presents first media, the media measurement entity is to credit the first media in media ratings calculations and market share reports.

In measuring media ratings, certain media (e.g., advertisements, television shows, movies, or any other type of broadcasting content) is produced by television stations (e.g., HBO, Disney Channel, Food Network, etc.) which use a watermark encoder to encode (e.g., embed) a watermark in the media prior to the media being provided to (e.g., transmitted to) a media presentation device (e.g., television). Some media is produced by television stations (e.g., C-SPAN) which do not utilize a watermark encoder to encode watermarks into the media. The non-encoded media may be identified (e.g., monitored) through a signature (e.g., fingerprinting) technique.

The media measurement entity (e.g., audience measurement service) provides the service of accurately reporting television viewing behavior for individuals. As used herein, for metered media devices (e.g., set-boxes, televisions, etc.), tuning of the media device to a television station and causing the media broadcast by that television station to be presented is credited as Homes Using Television (HUT) and is a factor in television ratings calculations. If a television station broadcasts watermarked media, then the media measurement entity credits presentation of the media to the television station. However, if the television does not broadcast watermarked media, the media measurement entity may be unable to credit the broadcast media to the correct station. In examples disclosed herein, for broadcast media that is not watermarked, the media measurement entity is able to use device mapping information to correlate the source of the signal to the television, and in cases where the device primarily provides a linear television feed, the media measurement entity is able to credit the media as All Other Tuning (AOT) which is a subset of Homes-Using-Television (HUT). Other activities occurring on the metered television such as game console usage or internet usage are not credited as HUT and are credited as Non-Homes-Using-Television (Non-HUT).

As used herein, media that is presented on a media presentation device may be classified (e.g., credited, labeled) in one of at least two media exposure classification groups (HUT and Non-HUT). A first classification group is media that is associated with a Television Station, which is referred to herein as Homes-Using-Television (HUT). In some examples, a HUT station is a linear TV station which means there is a relationship between when the media is produced, and when the media is presented by the media presentation device. For example, a sports broadcast may be occurring in "real-time" which is substantially live, but accounts for transmissions delays. In some examples, the sports broadcast may be delayed by a number of seconds, but the media presented corresponds to the media feed generated by filming the players on the field.

As used herein, "non-linear" means there is no relationship between when media is produced and when the media is presented. For example, a non-linear television feed may be a Video-On-Demand feed wherein the media may be produced in April and presented in May.

Within HUT, media is to be credited to a particular TV station (e.g., HBO, Disney channel, Food Network, etc.). However, some media is unable to be identified with watermarks, but is associated with a television broadcast, even if the specific, particular TV station is unknown. This media is credited (classified, labeled, etc.) as All-Other-Tuning (AOT), which is a catch-all classification for monitored television broadcast for which the television station is unknown. AOT is a subset of HUT. As used herein, AOT may refer to media that is associated with a television station, wherein the media does not have either watermarks (e.g., codes) or reference signatures to identify the media. Certain television stations (e.g., C-SPAN) do not use watermark encoding to encode media nor provide the media to a signature-generating service to generate reference signatures. Media produced by these certain television stations may be classified (credited, labeled, etc.) as AOT. As used herein, AOT may refer to a first media exposure category.

Some media source devices are able to tune to (e.g., provide access to) and present (or enable a connected presentation device, such as a television to present) a linear television feed. Such source devices include an over-the-air antenna, a cable, a satellite set top box, a television with direct cable access, etc. These source devices are a first type of source. The first type of source is associated with presenting of a linear television feed, wherein a creditor may determine that the media presented is to be classified (e.g., credited, labeled) as AOT (which is a subset of HUT).

A second media exposure classification group is media that is not associated with a television, which is referred to herein as Non-HUT. Some source devices are unlikely (or unable) to present a television station. These source devices include a DVD player, video game console, etc. Such sources are a second type of source. In some examples, Non-HUT refers to a second media exposure category which is to be excluded from the TV media ratings calculation.

As used herein, a set top box (STB), for the purposes of this disclosure, may be defined as a computerized device that processes digital information. The set top box may come in many forms and can have a variety of functions such as tuning to a television station, and may correspond to a cable box, satellite box, etc. A typical set top box receives encoded/compressed digital signals from the signal source (e.g., the content provider's headend) and decodes/decompresses those signals, converting them into signals that television can process. In some examples, the STB accepts commands from the user (often via the use of remote devices such as a remote control) and transmits these commands back to the network operator through a return path. In some examples, the STB has a return path capability for two-way communication.

STBs and other sources of the first type can make it possible to receive and display TV signals, connect to networks, play games via a game console, surf the Internet, interact with Interactive Program Guides (IPGs), access virtual channels, transact at electronic storefronts, enter walled gardens, send e-mail, and videoconference. Many STBs are able to communicate in real time with devices such as camcorders, DVD and CD players, portable media devices and music keyboards. Some have large dedicated hard-drives and smart card slots to insert smart cards into for purchases and identification.

Other source devices of the second type are typically unable, or unlikely, to provide access to (e.g., tune to) a linear television feed. Such source devices include a DVD player, some video game consoles, an online media player, etc. Although some versions of those types of source devices may include the capability to tune to (or otherwise provide access to) linear television feeds, that is not the primary use case for those devices and, thus, media presented by such second types of sources is classified (e.g., credited, labeled) as Non-HUT. In examples disclosed herein, the media measurement entity (e.g., audience measurement service) assumes that the media without watermarks presented by devices of the second source type is Non-HUT, even though some sources of the second type could stream or otherwise receive media that relates to media from a television station.

Television service providers may also provide other forms of media that are not typically referred to as broadcast content, such as gambling, Internet content, weather information, and/or shopping. The set top box 112 may also allow users to view a mosaic screen of several channels, a programming guide screen, and/or video-on-demand (VOD) services, each of which, if detected, provides a rich source of viewing habit information to an advertisement measurement company.

Meters that are installed on-site in a panelist home may detect possible embedded watermarks, and/or match generated signatures which represent the media to reference signatures for media presented on a media presentation device.

The media measurement entity then determines to either credit the media to the correct television station (HUT), credit the content as AOT after correlation with the source information (the source information being a determination if the source is a first type of source or a second type of source) or credit the media as Non-HUT. However, for meters that are unable to detect sources, such as a non-source detection meter, the same media (e.g., non-encoded, non-watermarked television media) that would be classified (e.g., credited, labeled) as AOT (a subset of HUT) with a source detection meter, would be classified as Non-HUT which is neither AOT nor HUT. As such, first media could be credited to a first media exposure category based on media crediting data from a first media meter, while that same first media could be credited to a second media exposure category based on media crediting data from a second media meter. Disclosed examples reduce/resolve such a discrepancy such that the same first media can be credited to the correct media exposure category, regardless of the meter used to monitor presentation of the first media. For example, disclosed solutions are able to credit non-monitored non-encoded media as AOT regardless of whether a source detection meter or a non-source detection meter is used to monitor presentation of the non-monitored non-encoded media.

Media measurement meters (also referred to herein as audience measurement meters, media meters, meters, etc. may be implemented by any meter (e.g., a set meter, an active/passive (A/P) meter, a meter within a set top box (STB), a portable people meter (PPM), portable metering via wireless telephones, portable metering via tablets, etc.) capable of measuring media selections presented on the media presentation device. The media measurement meter collects tuning data from devices, such as set top boxes, video game devices, video cassette recorders (VCRs), digital video recorders (DVRs) and/or digital versatile disk (DVD) players. The media measurement meter may be associated with any type of panel, such as a national people meter (NPM) panel, a local people meter (LPM) panel, households with third party monitoring entities (e.g., Experian®), and/or any other geographic area of interest. The media measurement meter may monitor which station is tuned, a corresponding time-of-day in which the station is tuned, a duration (e.g., number of minutes) the station is tuned, and/or to identify media associated with the tuned station (e.g., identify a program, an advertisement, etc.). Audience measurement data captured by the media measurement meter may include tuning information, signatures, codes (e.g., embedded into or otherwise broadcast with broadcast media).

Data collected by media measurement meter may be stored in a memory and transmitted via one or more networks, such as the Internet, to a data store managed by the market research entity (e.g., The Nielsen Company (US), LLC). Typically, such data is aggregated with data collected from a large number monitored panelist households. Such collected and/or aggregated data may be further processed to determine statistics associated with household behavior in one or more geographic regions of interest (e.g., designated market area (DMA) of interest). An example DMA of interest may be a city, a state, a time zone, a country, or another measure of geographical or numerical size as it pertains to monitoring media activity. In some examples, a DMA of interest spans millions of homes, wherein a human being is unable to detect watermarks, generate and compare signatures, and credit television stations for the millions of homes in a reasonable amount of time. The examples disclosed herein are a technical solution to a problem, unable to be reasonably completed by humans in the human mind or with pen and paper. Household behavior statistics may include, but are not limited to, a number of minutes a household media device was tuned to a particular station, a number of minutes a household media device was used (e.g., presenting media) by a household panelist member and/or one or more visitors, and demographics of an audience (which may be statistically projected based on the panelist data).

As used herein, media monitoring information (or media crediting data) may include generated signatures, detected watermarks, time stamps, source information, etc.

As used herein, a source detection meter is a media measurement meter that is able to detect the source (e.g., line, input, signal) of the media feed that is presented on the media presentation device. For example, a source detection meter may determine which one of a set of possible sources (e.g., STB, DVD player, game console, internal TV tuner, etc.) is actively providing media to the media presentation device for presentation. Examples of source detection meters include, but are not limited to, Nielsen's Global Television Audience Measurement (GTAM) meter, Nielsen's Active/Passive (A/P) meter, etc. As used herein, a non-source detection meter is a media measurement meter that is unable to detect the source (e.g., line, input, signal) of the media feed that is presented on the media presentation device. Examples of non-source detection meters include, but are not limited to, Nielsen's Nano meter, Nielsen's Code Reader meter.

Example source detection meters and non-source detection meter are able to detect audio watermarks (also reference to as audio codes) embedded in received audio signals. One or more detected audio watermarks may be stored in example memory to facilitate periodic, scheduled, aperiodic and/or manual transfer to the example data collection facility via the example data transmitter. The embedded audio watermarks may identify a television program or television station being presented by the example media device.

In some examples, a source detection meter or a non-source detection meter may employ a signature generator in place of or in addition to a watermark reader (e.g., code reader, watermark detector) to generate media signatures. Media signatures are a representation of one or more characteristics of the media signal (e.g., a characteristic of the frequency spectrum of the signal). Signatures can be thought of as fingerprints. Signatures are typically not dependent upon insertion of identification codes in the media, but instead preferably reflect an inherent characteristic of the media and/or the media signal. Systems to utilize codes and/or signatures for audience measurement are long known. See, for example, Thomas, U.S. Pat. No. 5,481,294, which is hereby incorporated by reference in its entirety.

FIG. 1 illustrates of an example operating environment 100 in which unknown media feeds (e.g., unidentified media) are credited utilizing a source detection meter and a non-source detection meter in accordance with teachings of this disclosure. FIG. 1 illustrates both a first example audio-video (AV) environment 102 and a second example audio-video (AV) environment 202, wherein media is presented in both environments. The first example AV environment 102 includes a media presentation device 108 to present media to one or more panelists 104, 106 (e.g., panel members, or persons, etc.) and a source detection meter 114 (e.g., Nielsen's GTAM meter, Nielsen's Active/Passive meter, etc.) to perform watermark detection and/or signature generation. The second example AV environment 202 includes a media presentation device 208 to present media to one or more panelists 204, 206 (e.g., panel members, or persons, etc.) and a non-source detection meter 214 (e.g., Nielsen's Nano meter, Nielsen's Code Reader meter, etc.) to perform watermark detection and/or signature generation.

In the illustrated example of FIG. 1, the first example AV environment 102 includes an example media presentation device 108 which is connected via an AV network (e.g., an HDMI-CEC protocol compliant network) to one or more AV devices including, but not limited to, a set top box (STB) 112 and a video game console 110.

As used herein, the video game console 110 may be any video game system, such as any version of the Xbox® by Microsoft®, the GameCube®, Wii® and/or the Switch® by Nintendo®, and/or any version of the PlayStation® by Sony®. Without limitation, video games may also be provided to the user via the set top box 112 (e.g., via the Internet) and displayed on the media presentation device (e.g., television) 108. Users may access the video game content stored on the set top box 112 and/or receive video game content from, for example, the television service provider.

The first example AV environment 102 includes an example source detection meter 114 that monitors (e.g., via indirect sensing, one or more direct connections, etc., or any combination thereof) the media presentation device 108 (e.g., the television), the example video game console 110 and the example set top box 112. The source detection meter 114 identifies the media presented by the media presentation device 108 and reports media monitoring information to an example audience measurement service 190 (e.g., a central facility, a cloud service, etc., or any combination thereof) of an example media measurement entity via an example gateway 140 and an example network 180. The panelists 104, 106 may interface with the devices connected to the first example AV environment 102 in many ways, one of which is through the use of one or more remote control devices (e.g., infrared (IR) and/or radio frequency (RF) remote control devices). The remote control device(s) may be designed to communicate with one or more AV devices from a single manufacturer or the remote control device(s) may include a universal remote control designed to communicate with multiple or all of the AV devices connected in the first example AV environment 102.

FIG. 1 depicts a second example AV environment 202 that is similar to the first example AV environment 102. The second example AV environment 202 includes an example media presentation device 208 which is connected via an AV network (e.g., an HDMI-CEC protocol compliant network) to one or more AV devices including, but not limited to, a set top box 212 and the example video game console 210. The second example AV environment 202 includes an example non-source detection meter 214 that monitors (e.g., via indirect sensing, a direct connection, etc., or any combination thereof) the media presentation device 208. The example set top box (STB) 212 and the example video game console 210 are coupled to the example media presentation device 208 but are not monitored by the example non-source detection meter 214. The non-source detection meter 214 generates signatures and/or detects watermarks relating to the media presented by the media presentation device 208 and reports the media monitoring information (e.g., watermarks and/or signatures, raw data, media crediting data) to the example audience measurement service 190 via an example gateway 240 and an example network 280. The panelists 204, 206 may interface with the devices connected to the second example AV environment 202 in many ways, one of which is through the use of one or more remote control devices (e.g., infrared (IR) and/or radio frequency (RF) remote control devices). The remote control device(s) may be designed to communicate with one or more AV devices from a single manufacturer or the remote control device(s) may include a universal remote control designed to communicate with multiple or all of the AV devices connected in the second example AV environment 202.

In the illustrated example, the media monitoring information reported by the source detection meter 114 (e.g., as represented by the example media crediting data 640 in FIG. 6A) and the non-source detection meter 214 (e.g., as represented by the example media crediting data 650 in FIG. 6B) can be used to identify the media presented by the media presentation devices 108, 208. In some examples, the audience measurement service 190 may generate media crediting data, such as the example media crediting data 660 of FIG. 6C, from the media monitoring information (e.g., raw data) as reported by the source detection meter 114 and the non-source detection meter 214. The signatures generated by the meters are also referred to as monitored signatures.

In some examples, the audience measurement service 190 checks if the reported media monitoring information includes watermarks. If watermarks are included in the reported media monitoring information, the audience measurement service 190 uses the identification information conveyed by the watermarks to credit the monitored media presented by the media presentation device to the correct TV station/program in a media ratings calculation (e.g., determining market share of a particular show). If there are not watermarks included in the reported media monitoring information, the audience measurement service 190 compares signatures generated by the meters (the source detection meters 114 and the non-source detection meters 214) in the reported media monitoring information. The example audience measurement service 190 compares the signatures generated by the meters with a reference signature database 306. If there is a match, the correct station is able to be credited. Otherwise, example techniques disclosed herein are used to credit unknown media feeds in accordance with teachings of this disclosure.

In the illustrated example of FIG. 1, the first example AV environment 102 is a room of a household (e.g., a room in a home of a panelist, such as the home of a "Nielsen family"). In the illustrated example of FIG. 1, the example panelists 104, 106, of the household have been statistically selected to develop media ratings data (e.g., television ratings data) for a population/demographic of interest. Likewise, the second example AV environment 202 of FIG. 1 is a room of a second household in which the panelists 204,

206 have been statistically selected to develop media ratings data. People become panelists via, for example, a user interface presented on a media device (e.g., via the TV 108, 208, via a website, etc.). People may become panelists in additional or alternative manners, such as, for example, via a telephone interview, by completing an online survey, etc. Additionally or alternatively, people may be contacted and/ or enlisted using any desired methodology (e.g., random selection, statistical selection, phone solicitations, Internet advertisements, surveys, advertisements in shopping malls, product packaging, etc.). In some examples, an entire family may be enrolled as a household of panelists. That is, while a mother, a father, a son, and a daughter may each be identified as individual panelists, their viewing activities typically occur within the family's household.

In the illustrated example of FIG. 1, one or more panelists 104, 106, 204, 206 of the household have registered with a media measurement entity (e.g., by agreeing to be a panelist) and have provided their demographic information to the media measurement entity as part of a registration process to enable associating demographics with media exposure activities (e.g., television exposure, radio exposure, Internet exposure, etc.). The demographic data includes, for example, age, gender, income level, educational level, marital status, geographic location, race, etc., of a panelist. While the first example AV environment 102 is a household in the illustrated example of FIG. 1, the first example AV environment 102 can additionally or alternatively be any other type(s) of environments such as, for example, a theater, a restaurant, a tavern, a retail location, an arena, etc. Likewise, the second example AV environment 202 can additionally or alternatively be any other type(s) of environments such as, for example, a theater, a restaurant, a tavern, a retail location, an arena, etc.

In the illustrated example of FIG. 1, the example media presentation devices 108, 208 are televisions. However, the example media presentation devices 108, 208 can correspond to any type of audio, video and/or multimedia presentation device capable of presenting media audibly and/or visually. In some examples, the media presentation devices 108, 208 (e.g., a television) may communicate audio to another media presentation device (e.g., an audio/video receiver) for output by one or more speakers (e.g., surround sound speakers, a sound bar, etc.). As another example, the media presentation devices 108, 208 (not shown in this view) can correspond to a multimedia computer system, a personal digital assistant, a cellular/mobile smartphone, a radio, a home theater system, stored audio and/or video played back from a memory, such as a digital video recorder or a digital versatile disc, a webpage, and/or any other communication device capable of presenting media to an audience (e.g., the panelists 104, 106, 204, 206).

In examples disclosed herein, a media measurement entity provides the source detection meter 114 to the panelist 104, 106 (or household of panelists) such that the source detection meter 114 may be installed in the first example AV environment 102. In some examples, the media measurement entity provides the non-source detection meter 214 to the panelist 204, 206 (or household of panelists) such that the non-source detection meter 214 may be installed in the second example AV environment 202. In some examples, the source detection meter 114 is installed by the panelists 104, 106 by electronically connecting the source detection meter 114 to the media presentation device 108 and other sources (e.g., the example video game console 110, a DVD player, a set top box 112 etc.) and configuring the source detection meter 114 to transmit media monitoring information to the audience measurement service 190 (e.g., central facility). However, in some examples, installation of the source detection meter 114 is performed by an installer (e.g., personnel from the media measurement entity) who installs the source detection meter 114 in the first example AV environment 102 and configures the source detection meter 114. Similarly, in some examples, the non-source detection meter 214 is installed by the panelists 204, 206 by electronically connecting the non-source detection meter 214 to the media presentation device 208 and configuring the non-source detection meter 214 to transmit media monitoring information to the audience measurement service 190 (e.g., central facility). However, the example non-source detection meter 214 is not electronically connected to other sources (e.g., a video game console 110, a DVD player, a set top box 212 etc.). However, in some examples, installation of the non-source detection meter 214 is performed by an installer (e.g., personnel from the media measurement entity) who installs the non-source detection meter 214 in the second example AV environment 202 and configures the non-source detection meter 214.

In some prior media monitoring techniques, the same media presented in a first AV environment 102 with a source detection meter 114 and presented in a second AV environment 202 with a non-source detection meter 214 may result in a different crediting result based on the type of meter. For example, source detection meters in the first example AV environment 102 may detect non-watermarked media that is not actively monitored (no reference signatures exist for the non-monitored media), but the source detection information provided by those meters may still enable crediting of the media to a first media exposure category (e.g., AOT) based on the source providing the monitored media. However, for meters that are unable to detect sources, such as the non-source detection meter 214 of the second example AV environment 202, the same media (e.g., non-encoded, non-watermarked television media) that might be classified (credited, result in, etc.) as a first media exposure category (AOT) with a source detection meter such as the example source detection meter 114 of the first example AV environment 102, might end up being classified (credited, labeled) as a second media exposure category (e.g., non-HUT). In contrast, disclosed example solutions are able to credit the same non-monitored non-encoded media in the media exposure category (e.g., AOT) regardless of whether a source detection meter or a non-source detection meter is used to collect the non-monitored non-encoded media.

The audience measurement service 190 may be implemented by an internet cloud, server farm, one or more server processors, etc. In some examples, the example audience measurement service 190 is a central facility including one or more servers that collect and process media monitoring information from the media meters (e.g., the source detection meters 114 and the non-source detection meters 214). In some examples, the audience measurement service 190 (e.g., central facility) analyzes the media monitoring information to identify, for example, which media presentation devices are the most owned, the most-frequently used, the least-frequently owned, the least-frequently used, the most/least-frequently used for particular type(s) and/or genre(s) of media, and/or any other media statistics or aggregate information that may be determined from the data. In some examples, media monitoring information includes generated signatures, detected watermarks, time stamps, source information, etc. The media presentation device information may also be correlated or processed with factors such as geodemographic data (e.g., a geographic location of the media exposure measurement location, age(s) of the panelist(s) associated with the media exposure measurement location, an income level of a panelist, etc.). Media presentation device information may be useful to manufacturers and/or advertisers to determine which features should be improved, determine which features are popular among users, identify geodemographic trends with respect to media presentation devices, identify market opportunities, and/or otherwise evaluate their own and/or their competitors' products.

Figure 2:
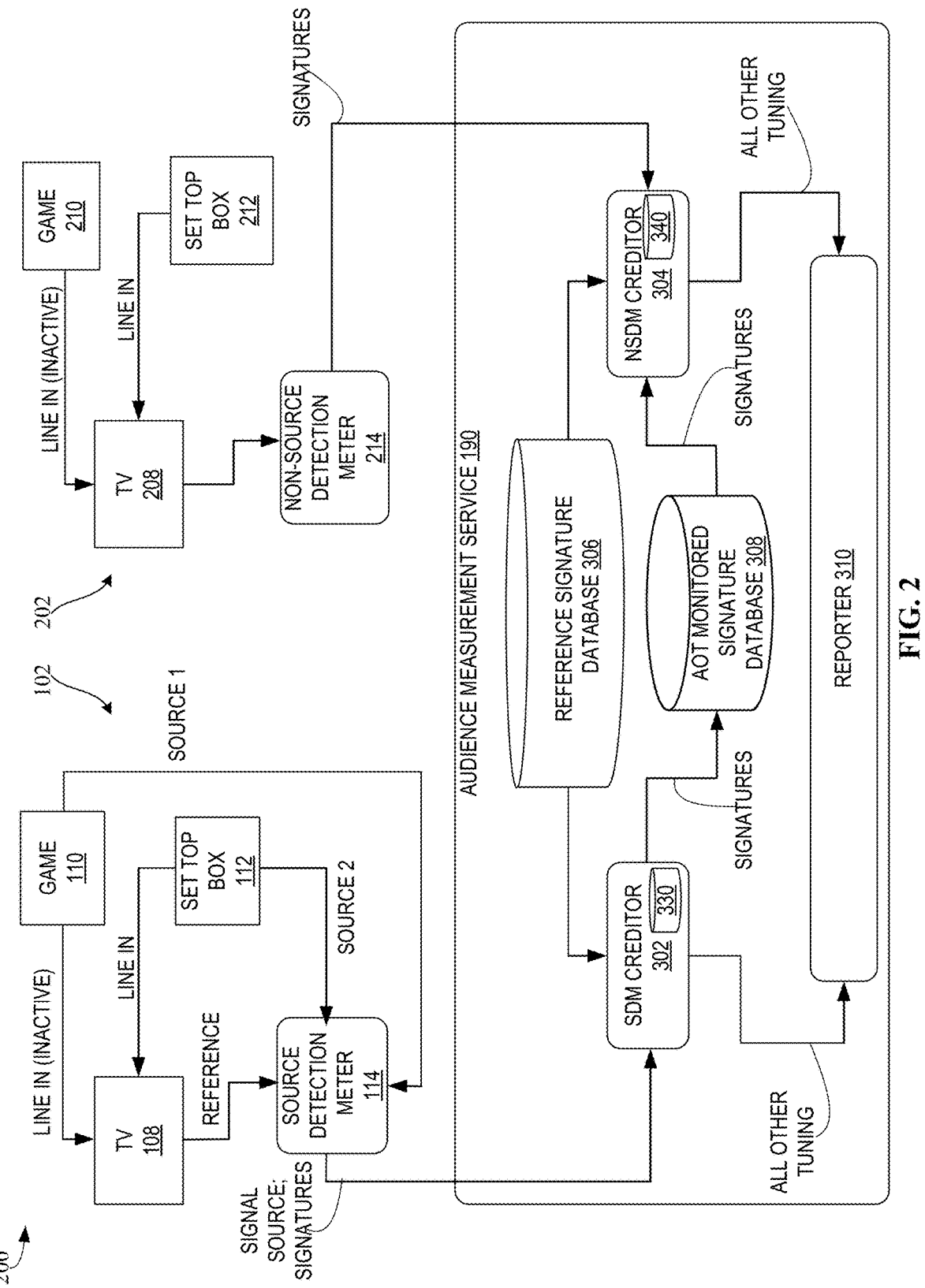
FIG. 2 is a block diagram of an example system that includes an example source detection meter, an example non-source detection meter, and an audience measurement service to credit unknown media feeds in accordance with teachings of this disclosure.

FIG. 2 is an example system diagram 200 illustrating the first example AV environment 102, the second example AV environment 202, and the audience measurement service 190 depicted in FIG. 1. In the first example AV environment 102 of the illustrated example, the example media presentation device 108 (e.g., a television, display device) is connected to two sources. The first type of source is associated with a first media exposure category (e.g., AOT classification, a HUT classification) and the second type of source is associated with a second media exposure category (e.g., Non-HUT classification). Examples of the first type of source that result in a HUT classification (and in some cases an AOT classification) include an over-the-air antenna, a cable set top box, a satellite set top box, etc. These first type of sources result in an HUT classification, because the reporter 310, described in further detail below, is to credit unidentified monitored media associated with such sources as AOT if the linear television station is unknown. Examples of the second type of source that result in a Non-HUT classification include a DVD player, video game console, etc., because the reporter assumes that the media associated with the second type of source is not associated with a linear television station.

In the illustrated example of FIG. 2, the source detection meter 114 records media crediting data (e.g., media measurement information). For example, the source detection meter 114 detects encoded watermarks, generates signatures, records the source that is currently being presented by the television 108, and records the date and time of the media. In some examples, the source detection meter 114 sends the media crediting data to the audience measurement service 190, wherein the audience measurement service 190 may generate a database file (such as the media crediting data 660 described in FIG. 6C or the media crediting data 640 in FIG. 6A). The signatures generated by the meters are referred to as monitored signatures.

In the example of FIG. 2, the media presentation device 108 is connected to the example video game console 110, the example set top box 112 and the source detection meter 114. The source detection meter 114 determines the source of the media being provided to the media presentation device 108 for presentation. For example, the source detection meter 114 can determine if media presentation device 108 is presenting media from the example video game console 110 or the set top box 112. In the example of FIG. 2, the example video game console 110 is a second type of source, and the example set top box 112 is a first type of source.

The meter of the second example AV environment 202 (e.g., the non-source detection meter 214) function (e.g., operate) similarly to the meter of the first example AV environment 102 (e.g., the source detection meter 114), but the meter of the second example AV environment 202 does not have source detection capabilities because the meter is an example non-source detection meter 214. In some examples, the example non-source detection meter 214 may generate a database file (such as the media crediting data 650 described in FIG. 6B). In other examples, the audience measurement service 190 may generate the database file (e.g., the media crediting data 660 or the media crediting data 650) based on the raw data (media measurement information). The non-source detection meter 214 does not have source detection capabilities, so the audience measurement service 190 may list "no-source" in the media crediting data associated with the non-source detection meter 214 as no source is able to be detected by the non-source detection meter 214. In some examples, the example non-source detection meter 214 may generate a database file (such as the media crediting data 650 described in FIG. 6B) that does not include a field for a detected media source. The signatures generated by the meters are referred to as monitored signatures.

In some examples, the audience measurement service 190 is to generate the media crediting data 660 of FIG. 6C by combining the example media crediting data 640 of FIG. 6A and the example media crediting data 650 of FIG. 6B. In some examples, the audience measurement service 190 is to generate the media crediting data 660 of FIG. 6C by using media measurement information (e.g., raw data) from the non-source detection meter 214 and the source detection meter 114.

The example audience measurement service 190 of FIG. 2 includes an example source detection creditor 302, an example non-source detection creditor 304, an example reference signature database 306, an example AOT monitored signature database 308, and an example reporter 310.

The example source detection creditor 302 is to receive (e.g., obtain, access, etc.) the monitored signatures from the source detection meter 114. The example source detection creditor 302 is to compare the monitored signatures with reference signatures in the reference signature database 306. If there is not a match between the monitored signatures and the reference signatures in the reference signature database 306, the example source detection creditor 302 determines the source of the media as reported by the source detection meter 114. If the source is a first type of source associated with linear television (e.g., an over-the-air antenna, a cable, a satellite set top box or a direct cable without set top box correlated with a television station), the source detection creditor 302 credits the media the monitored signatures represent as AOT (which is a subset of HUT) and stores the monitored signatures in the example AOT monitored signature database 308. As described in further detail below, the signatures stored in the AOT monitored signature database 308 can be used to for AOT crediting of media monitored by the non-source detection meters, such as the non-source detection meter 214, even though the non-source detection meters do not report the media sources associated with monitored media. However, if the source is a second type of source not associated with linear television (e.g., DVD player, video game console, or VHS), the source detection creditor 302 credits the media the monitored signatures represent as Non-HUT. The example source detection creditor 302 includes a first media information database 332 for storing media crediting data (which includes signatures, watermarks, time stamps, source information).

The example non-source detection creditor 304 is to receive (e.g., access, obtain, etc.) monitored signatures from the non-source detection meter 214. The example non-source detection creditor 304 is to compare the monitored signatures with reference signatures in the reference signature database 306. If there is not a match between the monitored signatures and the reference signatures in the reference signature database 306, the example non-source detection creditor 304 compares the monitored signatures with the signatures in the example AOT monitored signature database 308. If there is a match between the monitored signatures and the signatures in the example AOT monitored signature database 308, the non-source detection creditor 304 credits the media the monitored signatures represent as AOT (which is a subset of HUT). If the monitored signatures and the signatures in the example AOT monitored signature database 308 do not match, the non-source detection creditor 304 credits the media the monitored signatures represent as Non-HUT. The example non-source detection creditor 304 includes a second media information database 340 to store media crediting data (which includes signatures, watermarks, time stamps).

The example reference signature database 306 is to store signatures that correspond to media provided by the media provider. For example, a media provider (e.g., a television station) may provide media to be monitored to the example audience measurement service 190, from which the example audience measurement service 190 generates signature data corresponding to the media to be monitored. These signatures are referred to as reference signatures.

The example AOT monitored signature database 308 is to store the signatures derived from media crediting data generated by the source detection meters when the source is a HUT-likely source (e.g., a first type of source, a Tuning Source, an over-the-air antenna, a cable set top box, a satellite set top box, etc.). In some examples, the example AOT monitored signature database 308 is to store monitored signatures generated by the source detection meters when the source is a HUT-likely source.

In the illustrated example of FIG. 2, the audience measurement service 190 includes at least two example databases (a first media information database 332 and a second media information database 340) to record data (e.g., obtained information, non-signature data, time stamps, watermarks, etc.).

The example reference signature database 306, the example AOT monitored signature database 308, the first media information database 332, and the second media information database 340 may be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The example reference signature database 306 may additionally or alternatively be implemented by one or more double data rate (DDR) memories, such as DDR, DDR2, DDR3, DDR4, mobile DDR (mDDR), etc. The reference signature database 306 may additionally or alternatively be implemented by one or more mass storage devices such as hard disk drive(s), compact disk drive(s), digital versatile disk drive(s), solid-state disk drive(s), etc. While in the illustrated example the example reference signature database 306 is illustrated as a single database, the example reference signature database 306 may be implemented by any number and/or type(s) of databases. Furthermore, the data stored in the example reference signature database 306 may be in any data format such as, for example, binary data, comma delimited data, tab delimited data, structured query language (SQL) structures, etc.

The term "database" as used herein means an organized body of related data, regardless of the manner in which the data or the organized body thereof is represented. For example, the organized body of related data may be in the form of one or more of a table, a map, a grid, a packet, a datagram, a frame, a file, an e-mail, a message, a document, a report, a list or in any other form.

Figure 3:
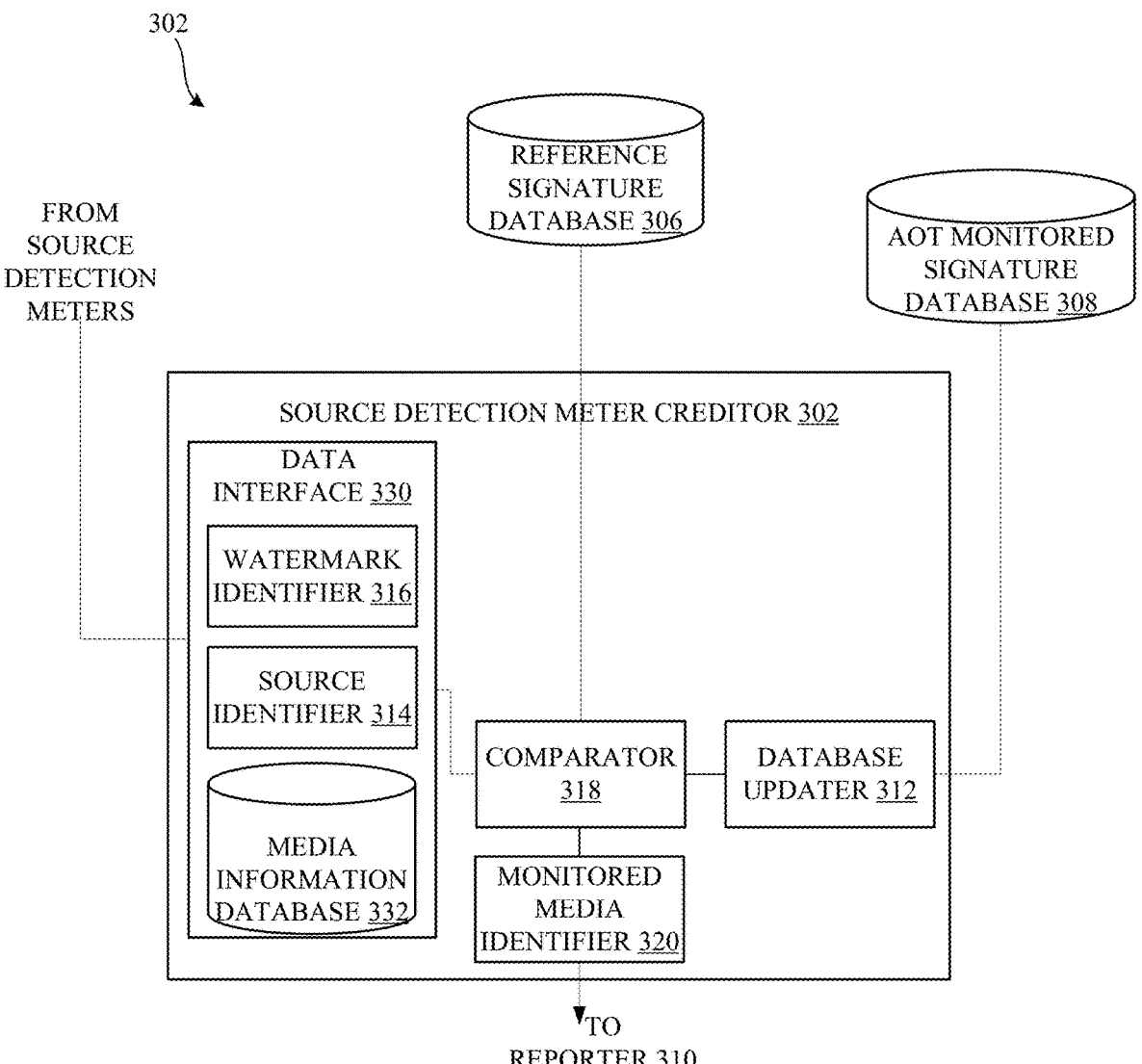
FIG. 3 is a block diagram of an example source detection creditor included in the audience measurement service of FIG. 2.

FIG. 3 is a block diagram of an example source detection creditor 302 of the audience measurement service 190 of FIG. 2. The example source detection creditor 302 includes a network connection to communicate with example source detection meters, the example reference signature database 306, the example AOT monitored signature database 308, and the example reporter 310 of the audience measurement service 190. The example source detection creditor 302 includes an example comparator 318, an example database updater 312, an example monitored media identifier 320, and an example data interface 330, which includes an example source identifier 314, an example watermark identifier 316, and an example first media information database 332.

The example source detection creditor 302 receives the media crediting data from the source detection meters, such as the source detection meter 114, at the example data interface 330. Data collected by the source detection meters (e.g., the source detection meters 114) may be stored in a memory and transmitted via one or more networks, such as the Internet, to the example sourced detection creditor 302 and in turn stored in a database (e.g., the first media information database 332). The example first media information database 332 of the source detection creditor 302 of the audience measurement service 190 may be managed by an audience measurement entity such as The Nielsen Company (US), LLC. Typically, such data is aggregated by the audience measurement entity with data collected from a large number of meters (e.g., the source detection meters 114 and the non-source detection meters 214) monitoring a large number of panelist households. Such collected and/or aggregated data may be further processed to determine statistics associated with household behavior in one or more designated market areas (DMA) of interest. An example DMA of interest may be a city, a state, a time zone, a country, or another measure of geographical or numerical size as it pertains to monitoring media activity. In some examples, a DMA of interest may span millions of homes.

The example data interface 330 is to receive the media crediting data from the source detection meters, perform preliminary processing of the media crediting data, and store the media crediting data in the example first media information database 332. The preliminary processing of the media crediting data includes using the watermark identifier 316 and the example source identifier 314.

In some examples, the example source detection creditor 302 initially attempts to identify the media by decoding encoded watermarks present in the media. The example source detection creditor 302 receives media crediting data (e.g., media crediting data 640 of FIG. 6A), which may include encoded watermark information. The example watermark identifier 316 operates to use watermarking techniques if the media crediting data includes watermarks. If watermark data is embedded (e.g., encoded) in the media crediting data, the example watermark identifier 316 communicates with the monitored media identifier 320 to credit media exposure for the television station that the embedded watermarks correspond to, in a report generated by the example reporter 310. If watermark data is not present in the media crediting data, the example source detection creditor 302 uses a signaturing technique to identify the media.

For media that is non-encoded (e.g., watermarks are not present), the example comparator 318 compares the monitored signatures (e.g., signature data, the signature column 610 of FIG. 6A, etc.) of the media crediting data with an example reference signature database 306. The example reference signature database 306 contains reference signature data for television programs that are actively monitored, but may or may not be encoded with watermarks. In some examples, the reference signature database 306 includes reference signature data corresponding to multiple television stations and television programs.

In some examples, the audience measurement service 190 generates the reference signature data in the example reference signature database 306 by sampling media to be monitored. For example, a media provider (e.g., a television station) may provide media to be monitored to the example audience measurement service 190, where the example audience measurement service 190 generates reference signature data corresponding to the media to be monitored. In these examples, the sampling rate (e.g., frequency) is higher than the sampling rate of the source detection meters 114 or the non-source detection meters 214. Having a faster (e.g., higher, more frequent) sampling rate allows more reference signature data to be produced for the media such that there are more chances for the monitored signatures (e.g., monitored signature data) sampled by the meters to align (e.g., match) to reference signatures (e.g., reference signature data) in the example reference signature database 306.

In some examples, the reference signatures are sampled at time instances that correspond to when the meter samples signatures to generate monitored signatures. For example, if the meter generates the monitored signatures by sampling every two seconds, the audience measurement service samples the media to generate reference signatures that are also sampled every two seconds.

The example comparator 318 compares the monitored signatures in the media crediting data (e.g., media crediting data 640 of FIG. 6A with reference signatures in the reference signature database 306. If the example comparator 318 determines the monitored signatures match reference signatures in the reference signature database 306, the comparator communicates with the example monitored media identifier 320 to credit the corresponding station (e.g., by associating the monitored media with the reference media corresponding to the matched reference signatures).

If the example comparator 318 determines the monitored signatures do not match reference signatures in the example reference signature database 306, the example comparator 318 communicates with the example database updater 312 and the example source identifier 314. The example comparator 318 communicates with the source identifier 314 to determine if the media represented by the monitored signatures is to be classified (e.g., credited) as AOT (a subset of HUT) or Non-HUT. The example comparator 318 determines the media represented by the monitored signatures is to be classified (e.g., credited) as AOT (a subset of HUT) in response to the source of the monitored media as reported in the media crediting data (e.g., column 608 of the media crediting data 640 of FIG. 6A) being a first type of source (e.g., an over-the-air antenna, a cable set top box, a satellite set top box, etc.). The example comparator 318 determines the media represented by the monitored signatures is to be classified (e.g., credited) as Non-HUT in response to the source of the monitored media as reported in the media crediting data (e.g., column 608 of the media crediting data 640 of FIG. 6A) being a second type of source (e.g., DVD player, video game console, etc.). The example comparator 318 classifies (e.g., credits) the media represented by the monitored signatures as AOT by communicating with the example monitored media identifier 320.

The example comparator 318 communicates with the database updater 312 to update the example AOT monitored signature database 308 in response to the monitored signatures that represent the media being classified (e.g., credited) as a first exposure classification group (e.g., as AOT). Recall that if the monitored signatures do not match signatures in the reference signature database 306, the television station that produced the media is unidentifiable. Because the media cannot be traced to a television station that produced the media, the media is classified (e.g., credited) as either the first exposure classification group of AOT (a subset of HUT) if the source is a first type of source (e.g., an over-the-air antenna, a cable set top box, a satellite set top box, etc.) or the second exposure classification group of Non-HUT if the source is a second type of source (e.g., DVD player, video game console, etc.). The example comparator 318 may communicate with the database updater 312 before, during, or after classifying the media represented by the monitored signatures as AOT.

Turning in detail to the example source identifier 314, for media that is non-encoded (e.g., watermarks are not present), the example source identifier 314 records (e.g., stores, saves, accesses) the source associated with the media crediting data. For example, the source detection meters may store whether the source is a first type of source (e.g., an over-the-air antenna, a cable set top box, a satellite set top box, etc.) or a second type of source (e.g., DVD player, video game console, etc.). For example, the source identifier 314 may store the source in the first media information database 332. In some examples, the source identifier 314 may access the source from the first media information database 332 and use the source information which is saved in the first media information database 332 to make the decision to communicate with the database updater 312 to append the monitored signatures to the example AOT monitored signature database 308. The example source identifier 314 communicates with the example database updater 312 with the source information.

If the source identifier 314 determines that the source information corresponds to the first type of source, the database updater 312 will determine if the monitored signatures that correspond to the first type of source are already represented in the example AOT monitored signature database 308. If the monitored signatures that correspond to the first type of source are not represented in the example AOT monitored signature database 308, the example database updater 312 will incorporate (e.g., add, upload, append, include, etc.) the monitored signatures to the example AOT monitored signature database 308. If the source identifier 314 determines that the source information corresponds to the second type of source, the database updater 312 will not incorporate the monitored signatures that correspond to the second type of source to the example AOT monitored signature database 308.

The monitored media identifier 320 determines to credit the monitored signatures as AOT (which is a subset of HUT) based on the monitored signatures being associated with the first type of source. If the example source identifier 314 determines that the source information corresponds to the second type of source, and the comparator 318 did not find a match in the reference signature database 306, the monitored media identifier 320 determines to credit the monitored signatures as Non-HUT.

The example monitored media identifier 320 communicates the reporting recommendation (e.g., instructions, determination to credit as AOT, or credit a specific station) to the example reporter 310 of the example audience measurement service 190.

Figure 4:
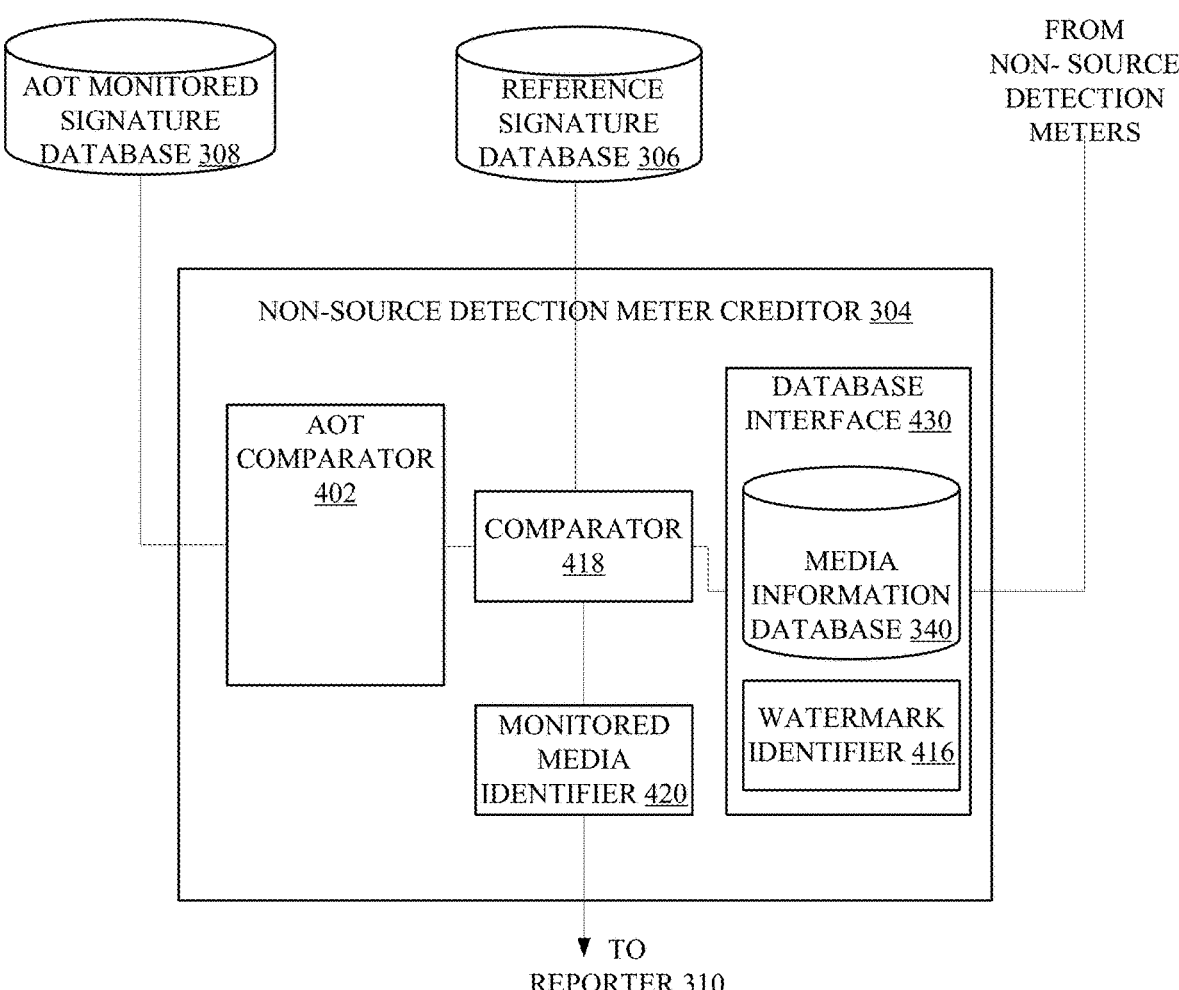
FIG. 4 is a block diagram of an example non-source detection creditor included in the audience measurement service of FIG. 2.

FIG. 4 is a block diagram of an example non-source detection creditor 304 of the audience measurement service 190 of FIG. 2. The example non-source detection creditor 304 is in communication with non-source detection meters (e.g., the non-source detection meter 214), the example reference signature database 306, the example AOT monitored signature database 308, and the example reporter 310 of the example audience measurement service 190. The example non-source detection creditor 304 includes an example AOT comparator 402, an example comparator 418, an example watermark identifier 416, and an example database interface 430, which includes a second media information database 340 and an example watermark identifier 416.

In some examples wherein the source detection creditor 302 and the non-source detection creditor 304 are implemented by a single creditor, the example comparator 418, the watermark identifier 416, and the monitored media identifier 420 are implemented by the example comparator 318 of FIG. 3, the example watermark identifier 316 of FIG. 3, and the example monitored media identifier 320 of FIG. 3.

The example non-source detection creditor 304 receives media crediting data (also referred to as second media crediting data to distinguish it from the media crediting data, e.g., first media crediting data, reported by the source detection meters) from multiple non-source detection meters, such as the non-source detection meter 214. In some examples, the example media presentation device 208 (of FIGS. 1 and/or 2) may present the same, or similar, media (e.g., information, television program, advertisement, content) as the example media presentation device 108 (of FIGS. 1 and/or 2), but the media crediting data recorded by the non-source detection meter 214 (of FIGS. 1 and/or 2) is different than the media crediting data recorded by the source detection meter 114 (of FIGS. 1 and/or 2).

For example, the example second media crediting data from the non-source detection meters includes fields corresponding to watermarks, signatures, time stamps, etc., similar to the first media crediting data from the source detection meters, but does not include a source. In some examples, the database file (e.g., media crediting data 660 of FIG. 6C) is generated by the non-source detection creditor 304 from the second media crediting data that is received from the non-source detection meters, wherein the non-source detection creditor 304 enters "n/a", "source not detected," "non-source," or "no source" for the source for the entries of the database file. In some examples, the field for storing source information is absent from the non-source detection meters (e.g., media crediting data 650 of FIG. 6B).

The second media crediting data recorded by the non-source detection meters may correspond to one or more geographic regions of interest (e.g., designated market area (DMA) of interest). An example DMA of interest may be a city, a state, a time zone, a country, or another measure of geographical or numerical size as it pertains to monitoring media activity. In some examples, a DMA of interest spans millions of homes, wherein a human being is unable to detect watermarks, generate and compare signatures, and credit television stations for the millions of homes in a reasonable amount of time. The examples disclosed herein are a technical solution to a problem, unable to be reasonably completed by humans in the human mind or with pen and paper.

The example non-source detection creditor 304 receives the second media crediting data from the non-source detection meters at the example database interface 430. The example database interface 430 includes an example second media information database 340 and an example watermark identifier 416. In the illustrated example, the example watermark identifier 416 implements functionality similar or identical to the example watermark identifier 316 of FIG. 3 to identify watermarks. The example watermark identifier 416 is to identify a watermark in the second media crediting data received from the non-source detection meters. If the example watermark identifier 416 determines watermarks are present (e.g., embedded, encoded) in the second media crediting data, the example watermark identifier 416 communicates with the example monitored media identifier 420 to credit media exposure for the television station that the embedded watermarks correspond to, in a report generated by the example reporter 310. If watermark data is not present in the second media crediting data, the example non-source detection creditor 304 uses a signaturing technique to identify the media. The example non-source detection creditor 304 uses the example comparator 418 in the signaturing technique.

In the illustrated example, the example comparator 418 implements functionality similar or identical to the example comparator 318 of FIG. 3 to compare signatures in the second media information database 340 with signatures in the reference signature database 306. The example comparator 418 is to compare the monitored signatures in the second media crediting data with the reference signatures in the example reference signature database 306. If the example comparator 418 determines the second monitored signatures in the second media crediting data match reference signatures in the reference signature database 306, then the example comparator 418 communicates with the example monitored media identifier 420 to credit the media that corresponds to the monitored signatures. If the comparator 418 determines the monitored second signatures do not match the reference signatures in the reference signature database 306, the comparator 418 communicates with the example AOT comparator 402.

The example AOT comparator 402 compares the second (e.g., received) monitored signatures that did not match the reference signatures in the reference signature database 306 with the monitored signatures in the example AOT monitored signature database 308. If the AOT comparator 402 determines the second monitored signatures match other monitored signatures stored in the example AOT monitored signature database 308, then the example AOT comparator 402 communicates with the example monitored media identifier 420 to credit (e.g., classify) the second monitored signatures as AOT (which is a subset of HUT). If the second monitored signatures do not match signatures in the example AOT monitored signature database 308, the AOT comparator 402 communicates with the monitored media identifier to credit (e.g., classify) the second monitored signatures as Non-HUT. The example audience measurement service 190 is to credit (e.g., classify) the second monitored signatures that match monitored signatures in the example the example AOT monitored signature database 308 as AOT, because the monitored signatures in the example AOT monitored signature database 308 are credited as AOT. The monitored signatures in the example AOT monitored signature database 308 are associated with a first type of source which is associated with a first classification (AOT, which is a subset of HUT). The example audience measurement service 190 is to credit (e.g., classify) the second monitored signatures that do not match reference signatures in the example reference signature database 306 and do not match monitored signatures in the example AOT monitored signature database 308 as Non-HUT because the source of the second monitored signatures is unknown.

Figure 5:
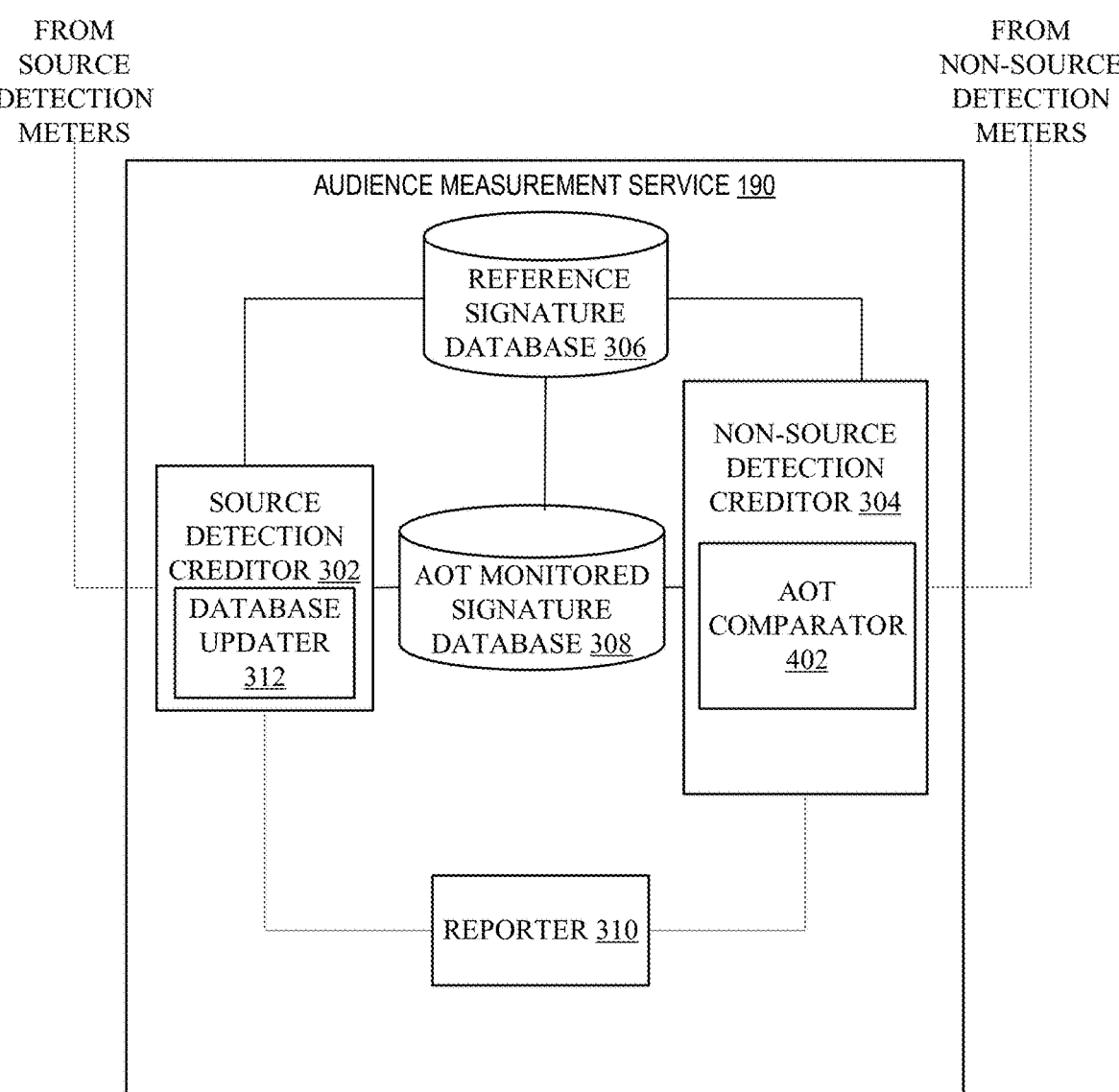
FIG. 5 is a block diagram of the example audience measurement service of FIG. 2.

FIG. 5 illustrates another example implementation of the audience measurement service 190. In the illustrated example, the example audience measurement service 190 is connected to a plurality of source detection meters and a plurality of non-source detection meters for the large demographic area. The example audience measurement service 190 uses the source detection creditor 302 to receive a first group of media crediting data from the source detection meters, wherein the media crediting data includes one or more of watermarks, time stamps, source information, and signatures. In the illustrated example of FIG. 5, it is assumed there are no watermarks for the media being monitored in the illustrated example.

In the example of FIG. 5, the example audience measurement service 190 uses the example source detection creditor 302 to compare the first group of signatures (e.g., the monitored signatures) with the reference signature database 306, and in response to the first group of signatures matching signatures in the reference signature database 306, uses the example reporter 310 to credit (e.g., classify) the signatures as HUT. The monitored signatures are credited (e.g., classified) as HUT, because the reference signatures in the reference signature database 306 were generated based on specific media to be monitored. In some examples, the media to be monitored was provided to the example audience measurement service 190 and the audience measurement service 190 generated signatures and stored those reference signatures in the example reference signature database 306. If the first signatures do not match reference signatures in the reference signature database 306, the source detection creditor 302 analyzes the source of the monitored signatures.

The source detection creditor 302 analyzes the source of the monitored signatures, and in response to the source corresponding to a second type of source (e.g., DVD player, video game console, etc.), the source detection creditor 302 communicates with the example reporter 310 to credit (e.g., classify) the media the monitored signatures correspond to as Non-HUT. In response to the source corresponding to a first type of source (e.g., over-the-air antenna, a cable set top box, a satellite set top box, etc.), the example source detection creditor 302 performs at least two actions. The first action is utilizing the example database updater 312 to append (e.g., add, store) the monitored signatures associated with the first type of source in the example AOT monitored signature database 308. The second action is to communicate to the example reporter 310 to credit (e.g., classify) the media corresponding to the monitored signatures associated with the first type of source as AOT (which is a subset of HUT). The first action and the second action may occur concurrently, the first action may occur before the second action, or the second action may occur before the first action.

The example audience measurement service 190 uses the non-source detection creditor 304 to receive second media crediting data from the non-source detection meters, wherein the second media crediting data includes one or more of watermarks, time stamps and signatures, but does not include source information. In the illustrated example of FIG. 5, it is assumed there are no watermarks for the media being monitored in the illustrated example.

The example non-source detection creditor 304 first checks the example reference signature database 306 for reference signatures that may match the received signatures from the second media crediting data. In response to finding matching reference signatures, the example non-source detection creditor 304 credits (e.g., classifies) the media the monitored signatures correspond to as HUT.

In response to the monitored signatures not matching the reference signature database 306, the example non-source detection creditor 304 uses the example AOT comparator 402. The example AOT comparator 402 compares the second monitored signatures with signatures in the example AOT monitored signature database 308, wherein the example AOT monitored signature database 308 is a database of monitored signatures that are associated with the first type of source (e.g., over-the-air antenna, a cable set top box, a satellite set top box, etc.). In response to the AOT comparator 402 determining that the second signatures match monitored signatures in the example AOT monitored signature database 308, the example audience measurement service 190 uses the example reporter 310 to credit (e.g., classify) the second monitored signatures as AOT (a subset of HUT). In response to the AOT comparator 402 determining that the second monitored signatures do not match monitored signatures in the example AOT monitored signature database 308, the example audience measurement service 190 uses the example reporter 310 to credit the second monitored signatures as Non-HUT.

The example reporter 310 is to credit (e.g., classify) the media the monitored signatures correspond to as HUT, AOT (which is a subset of HUT) or Non-HUT depending on the instructions received. The example reporter 310 credits (e.g., classifies) media as HUT depending on watermarks embedded (e.g., encoded) in the media or if monitored signatures corresponding to the media are matched with the example reference signature database 306. The example reporter 310 credits (e.g., classifies) monitored signatures from the source detection creditor 302 that are associated with a first type of source (e.g., over-the-air antenna, a cable set top box, a satellite set top box, etc.) as AOT. The example reporter 310 credits (e.g., classifies) monitored signatures from the non-source detection creditor 304 that match monitored signatures in the example AOT monitored signature database 308 as AOT. The example reporter 310 credits (e.g., classifies) media the monitored signatures correspond to, the monitored signatures from the source detection creditor 302 that are associated with a second type of source (e.g., DVD player, video game console, etc.) as Non-HUT. The example reporter 310 credits (e.g., classifies) monitored signatures from the non-source detection creditor 304 that do not match reference signature in both the reference signature database 306 and do not match monitored signatures in the example AOT monitored signature database 308 as Non-HUT.

FIGS. 6A-6C provide a visual representation of example meter data (e.g., media information, database file, media information file, media file, etc.). The visual representation of the media crediting data includes six columns or data fields. The media crediting data of the illustrated example includes a date column 602, a time column 604, a watermark column 606, a source column 608, a signature column 610, and a credit destination column 612. In some examples, the media crediting data includes a source column 608 (of FIGS. 6A and 6C). The media crediting data of FIGS. 6A-6C includes one or more rows, which refer to individual database entries.

FIG. 6A illustrates example media crediting data 640 from the source detection meters. In some examples, the source detection meters send the media crediting data 640 to the source detection creditor 302 (of FIGS. 2, 3, 5). In some examples, the source detection meters send raw data to the source detection creditor 302 (of FIGS. 2, 3,5) and the source detection creditor 302 generates the media crediting data 640 from the raw data. The first entry 614 (e.g., the first row of FIG. 6A) of the media crediting data 640 refers to media that does not include a watermark but includes monitored signature data recorded for one hour between 2 PM and 3 PM on April 8$^{th}$. The first entry 614 was recorded by a source detection meter, and the source is a set top box. In some examples, a different first type of source such as a television antenna may be represented in the source column 608 for the first entry 614. The signature data for the first entry 614 is "AABBAA" and in this illustrated example, the signature data does not match any reference signatures in the reference signature database 306 of FIG. 3. The first entry 614 is credited (e.g., classified) by the reporter 310 of FIG. 5 (or the monitored media identifier 320 of FIG. 3) as AOT (a subset of HUT) because the source is a first type of source (e.g., over-the-air antenna, a cable set top box, a satellite set top box, etc.). The example database updater 312 of FIG. 3 updates the example AOT monitored signature database 308 to include the signature entry "AABBAA" to the database.

The fifth entry 622 (the second row of FIG. 6A, or the fifth row of FIG. 6C) refers to media that does not include a watermark but includes monitored signature data recorded for one hour between 2 PM and 3 PM on April 8$^{th}$. The fifth entry 622 was recorded by a source detection meter, and the source is a second type of source. In the illustrated example of FIG. 6A, the second type of source is a game console. The monitored signature data for the fifth entry 622 is "AABBCC," and in this illustrated example, the signature data does not match any reference signatures in the reference signature database 306 of FIG. 3. The fifth entry 622 is credited (e.g., classified) by the reporter 310 of FIG. 5 (or the monitored media identifier 320 of FIG. 3) as Non-HUT because the source is a second type of source (e.g., DVD player, video game console, etc.).

FIG. 6B illustrates example media crediting data 650 from the non-source detection meters. In some examples, the non-source detection meters send the media crediting data 650 to the non-source detection creditor 304 (of FIGS. 2, 4, 5). In some examples, the non-source detection meters send raw data to the non-source detection creditor 304 (of FIGS. 2, 4,5) and the non-source detection creditor 304 generates the media crediting data 650 from the raw data. The second entry 616 (the first row of FIG. 6B and the second row of FIG. 6C) refers to media that does not include a watermark recorded for one hour between 2 PM and 3 PM on April 8$^{th}$. The second entry 616 was recorded by a non-source detection meter.

In some prior crediting techniques, the second entry 616 would be incorrectly credited as Non-HUT, and not be credited as AOT (a subset of HUT). Under such a prior technique, there is an inaccuracy due to the lack of source detection. Under the current solution, the second entry 616 is credited as AOT, because the monitored signature data of the second entry ("AABBAA") matches monitored signature data in the example AOT monitored signature database 308 of FIG. 3. The example database updater 312 (of FIGS. 3 and/or 5) updated the signatures of the first entry 614 ("AABBAA") to the example AOT monitored signature database 308 of FIGS. 2,3,4,5. The AOT comparator 402 compares the monitored signatures of the second entry 616 to signatures in the example AOT monitored signature database 308. The monitored signatures of the first entry 614 "AABBAA" match monitored signatures in the second entry 616 "AABBAA," and because the first entry 614 is credited (e.g., classified) as AOT, the second entry 616 is also credited (e.g., classified) as AOT.

The example third entry 618 (the second row of media crediting data 650 and the third row of media crediting data 660) refers to game content captured with a non-source detection meter. The game console is an example of a second type of source (a source not investigated, monitored, tracked, etc.). The signature data "AABBCC" is not placed in the example AOT monitored signature database 308 of FIG. 3. The example third entry 618 and the example fifth entry 622 refer to the same media. The fifth entry 622 illustrates that the video game console is the type of source that produced the signature data "AABBCC," but is stored as Non-HUT for a first reason, while the signature data referring (e.g., corresponding) to the same media captured with a different device in a different household (the third entry 618) is stored as Non-HUT for a second reason. The first reason why the fifth entry 622 is stored as Non-HUT is because the source is not a first type of source. The second reason why the signatures corresponding to the same media (the third entry 618) is stored as Non-HUT is because the monitored signatures corresponding to the third entry 618 are not in the example AOT monitored signature database 308. The example audience measurement service 190 is consistent with crediting (e.g., classifying) media as Non-HUT regardless of if the monitored signatures are generated by source detection meters or non-source detection meters.

The fourth entry 620 highlights that watermarked media is credited for the television station that watermarked the media. The specific television station is an example of HUT.

FIG. 6C illustrates example media crediting data 660 from both source detection meters and non-source detection meters. In some examples, wherein the source detection creditor 302 and the non-source detection creditor 304 are implemented by a single creditor, the source detection meters send the media crediting data 640 to the single creditor and the non-source detection meters send the media crediting data 650 to the single creditor. The single creditor is to combine the media crediting data 640 and the media crediting data 650 to generate the media crediting data 660. In some examples, the source detection meters send raw data to the source detection creditor 302 (of FIGS. 2, 3,5) and the non-source detection meters send raw data to the non-source detection creditor 304 (of FIGS. 2,4,5), and the audience measurement service 190 is to generate the media crediting data 660 from the source detection meter raw data and the non-source detection meter raw data.

The audience measurement service 190 may utilize the label "no source," "n/a", "non-source" for the source column 608 for entries that are generated from non-source detection meters. For example, the second entry 616, the third entry 618, and the fourth entry 620 of media crediting data 660 of FIG. 6C are generated from non-source detection meters, so the label "no-source" is applied in column 608, while column 608 is absent in media crediting data 650 of FIG. 6B.

While an example manner of implementing the audience measurement service 190 is illustrated in FIGS. 1-5, one or more of the elements, processes and/or devices illustrated in FIGS. 1-5 may be combined, divided, re-arranged, omitted, eliminated and/or implemented in any other way. Further, the example source detection creditor 302, the example non-source detection creditor 304, the example reporter 310, the example AOT monitored signature database 308, the example reference signature database 306 and/or, more generally, the example audience measurement service 190 may be implemented by hardware, software, firmware and/or any combination of hardware, software and/or firmware. Thus, for example, any of the example source detection creditor 302, the example non-source detection creditor 304, the example reporter 310, the example AOT monitored signature database 308, the example reference signature database 306 and/or, more generally, the example audience measurement service 190 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC (s)), programmable logic device(s) (PLD(s)) and/or field programmable logic device(s) (FPLD(s)). When reading any of the apparatus or system claims of this patent to cover a purely software and/or firmware implementation, at least one of the example, source detection creditor 302, the example non-source detection creditor 304, the example reporter 310, the example AOT monitored signature database 308, and/or the example reference signature database 306 is/are hereby expressly defined to include a non-transitory computer readable storage device or storage disk such as a memory, a digital versatile disk (DVD), a compact disk (CD), a Blu-ray disk, etc. including the software and/or firmware. Further still, the example audience measurement service 190 may include one or more elements, processes and/or devices in addition to, or instead of, those illustrated in FIGS. 1-5, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Flowcharts representative of example hardware logic, machine readable instructions, hardware implemented state machines, and/or any combination thereof for implementing the audience measurement service 190 of FIGS. 1-5 are shown in FIGS. 7-11. The machine readable instructions may be one or more executable programs or portion(s) of an executable program for execution by a computer processor and/or processor circuitry, such as the processor 1212 shown in the example processor platform 1200 discussed below in connection with FIG. 12. The program(s) may be embodied in software stored on a non-transitory computer readable storage medium such as a CD-ROM, a floppy disk, a hard drive, a DVD, a Blu-ray disk, or a memory associated with the processor 1212, but the entire program(s) and/or parts thereof could alternatively be executed by a device other than the processor 1212 and/or embodied in firmware or dedicated hardware. Further, although the example program (s) is (are) described with reference to the flowcharts illustrated in FIGS. 7-11, many other methods of implementing the example audience measurement service 190 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 7-11 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 7 is a flowchart representative of machine readable instructions 700 which may be executed to implement the source detection meter 114 of FIG. 2. At block 702, the source detection meter 114 accesses unidentified media from a media presentation device. For example, the source detection meter 114 may access unidentified media from a media presentation device by recording media on a television that is tuned to a station that produces non-encoded (e.g., non-watermarked) media.

The source detection meter 114 generates signature data relating to the unidentified media (block 704). For example, the source detection meter 114 may generate signature data relating to the unidentified media by recording peak to peak transmissions and storing the signatures in a file. The signatures generated by the meters are referred to as monitored signatures.

The source detection meter 114 accesses detected source information for the unidentified media (block 706). For example, the source detection meter 114 may access detected source information for the unidentified media by using the source detection feature to record the source the media presentation device is using. For example, a media presentation device may be using a first type of source (e.g., over-the-air antenna, a cable set top box, a satellite set top box, etc., a source that is associated with linear television, a source associated with HUT or AOT) or a second type of source (e.g., DVD player, video game console, a source associated with Non-HUT).

The source detection meter 114 links the monitored signatures with the detected source (block 708). For example, the source detection meter 114 may link the monitored signatures with the detected source by tagging the signature file with a determination of the source the media presentation device is using. For example, the source detection meter 114 may link the signatures with the detected source by generating media crediting data (e.g., media crediting data 640 of FIG. 6A) that includes a field for recording the source and a field for recording the signatures.

The source detection meter 114 stores the linked source information and signature data relating to the unidentified media (block 710). For example, the source detection meter 114 may store the linked source information and monitored signature data relating to the unidentified media by updating the fields in a database file (e.g., media crediting data 640) in source detection meter memory.

The source detection meter 114 sends the linked source information and monitored signature data relating to the unidentified media to a source detection creditor 302 (block 712). For example, the source detection meter 114 may send the linked source information and monitored signature data relating to the unidentified media to a source detection creditor 302 by transferring the database file (e.g., media crediting data 640) to the source detection creditor 302 of the audience measurement service 190. The instructions 700 end.

Figure 8:
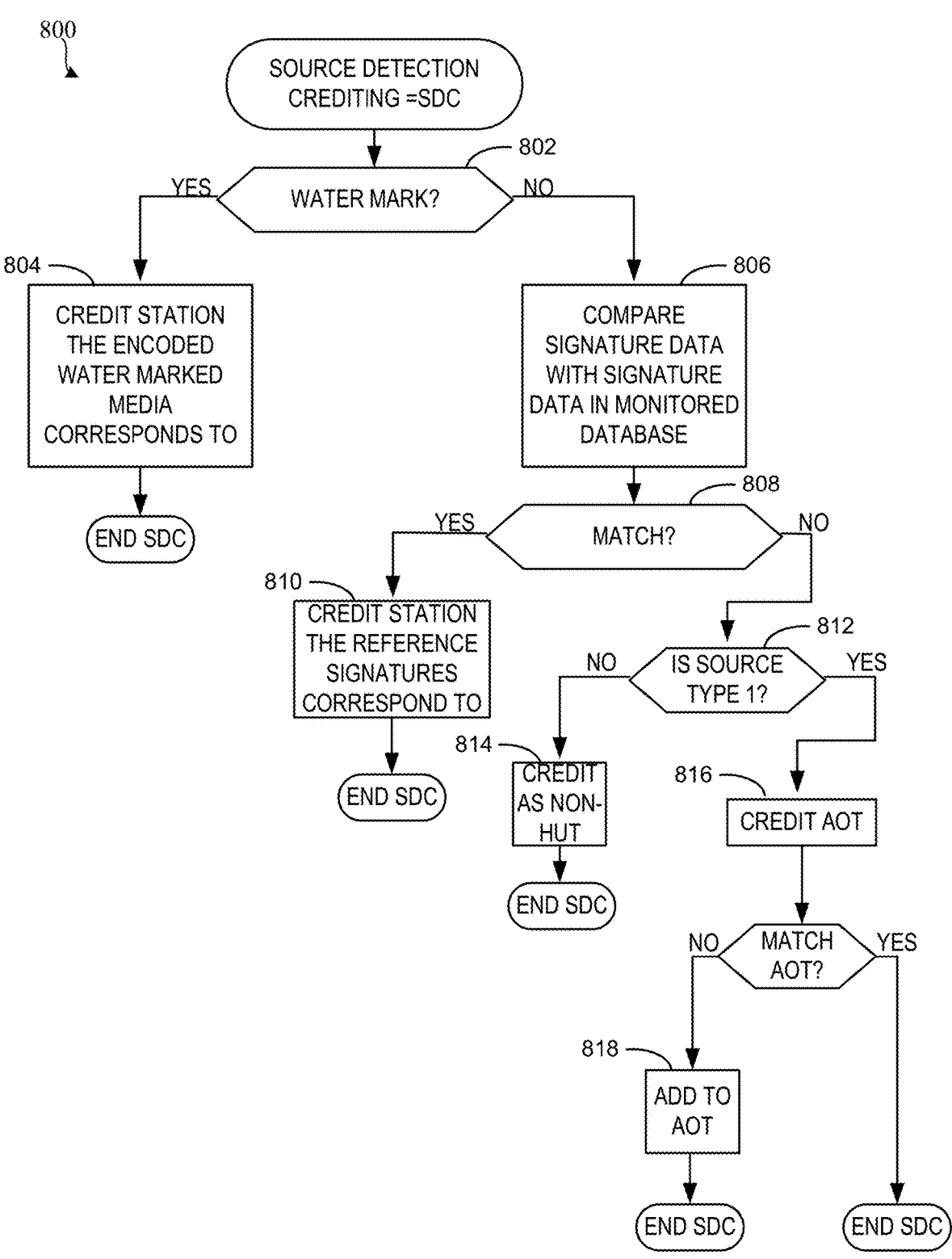
FIG. 8 is a flowchart representative of example machine readable instructions which may be executed to implement the source detection creditor of FIG. 2.

FIG. 8 is a flowchart representative of machine readable instructions 800 which may be executed to implement the source detection creditor 302 of FIG. 2. At block 802, the example source detection creditor 302 determines if the media crediting data (e.g., media crediting data 640 of FIG. 6A, the linked source information and signature data relating to the unidentified media, etc.) includes watermarks. If the example source detection creditor 302 determines the media crediting data does include watermarks for a particular database entry (e.g., the fourth entry 620 of FIG. 6A), control flows to block 804.

At block 804, the example source detection creditor 302 credits media exposure for the television station that the embedded watermarks correspond to. The instructions 800 end. If the example source detection creditor 302 determines the database file does not include watermarks for a particular database entry (e.g., first entry 614), control flows to block 806.

At block 806, the example source detection creditor 302 compares the monitored signature data of the particular database entry with reference signature data in the reference signature database 306. After the comparison, control flows to block 808, wherein the example source detection creditor 302 determines if the monitored signature data of the database entry matches reference signature data in the reference signature database 306.

If the example source detection creditor 302 determines there was a match, control flows to block 810. At block 810, the example source detection creditor 302 credits the television station the reference signatures correspond to. For example, a media provider (e.g., a television station) may provide media to be monitored to the example audience measurement service 190, where the example audience measurement service 190 generates signature data corresponding to the media to be monitored. The reference signature data which is linked to a specific media provider (e.g., television station) is stored in the reference signature database 306, and if monitored signature data from the media crediting data matches reference signature data in the reference signature database 306, the specific media provider is credited with media exposure. The instructions 800 end If the example source detection creditor 302 determines there was not a match, control flows to block 812. At block 812, the example source detection creditor 302 determines if the source of the database entry is a first type of source. For example, a first type of source may be a source that the audience measurement entity is interested in tracking. Examples of first type of sources include an over-the-air antenna, a cable set top box, a satellite set top box, etc. First type of sources as associated with linear television, so the first type of sources are credited (e.g., classified) as AOT (which is a subset of HUT). If the example source detection creditor 302 determines the source of the database entry is not a first type of source, control flows to block 814.

At block 814, the example source detection creditor 302 credits the media as Non-HUT in response to the source of the database entry not being a first type of source. For example, the fifth entry 622 of FIG. 6C is credited as Non-HUT, because the source is a second type of source. For example, a second type of source includes DVD players, video game consoles, etc. The instructions 800 end. If the example source detection creditor 302 determines the source of the database entry is a first type of source, control flows to block 816.

At block 816, the example source detection creditor 302 credits the media the signatures correspond to as AOT (which is a subset of HUT). Control flows to block 818. At block 818, the example source detection creditor 302 determines if the monitored signatures are already represented in the AOT reference database. If the monitored signatures are already in the AOT reference database, the instructions 800 end.

If the monitored signatures are not already in the AOT reference database, control flows to block 818, where the source detection creditor adds the monitored signatures to the AOT reference database. The instructions 800 end.

Figure 9:
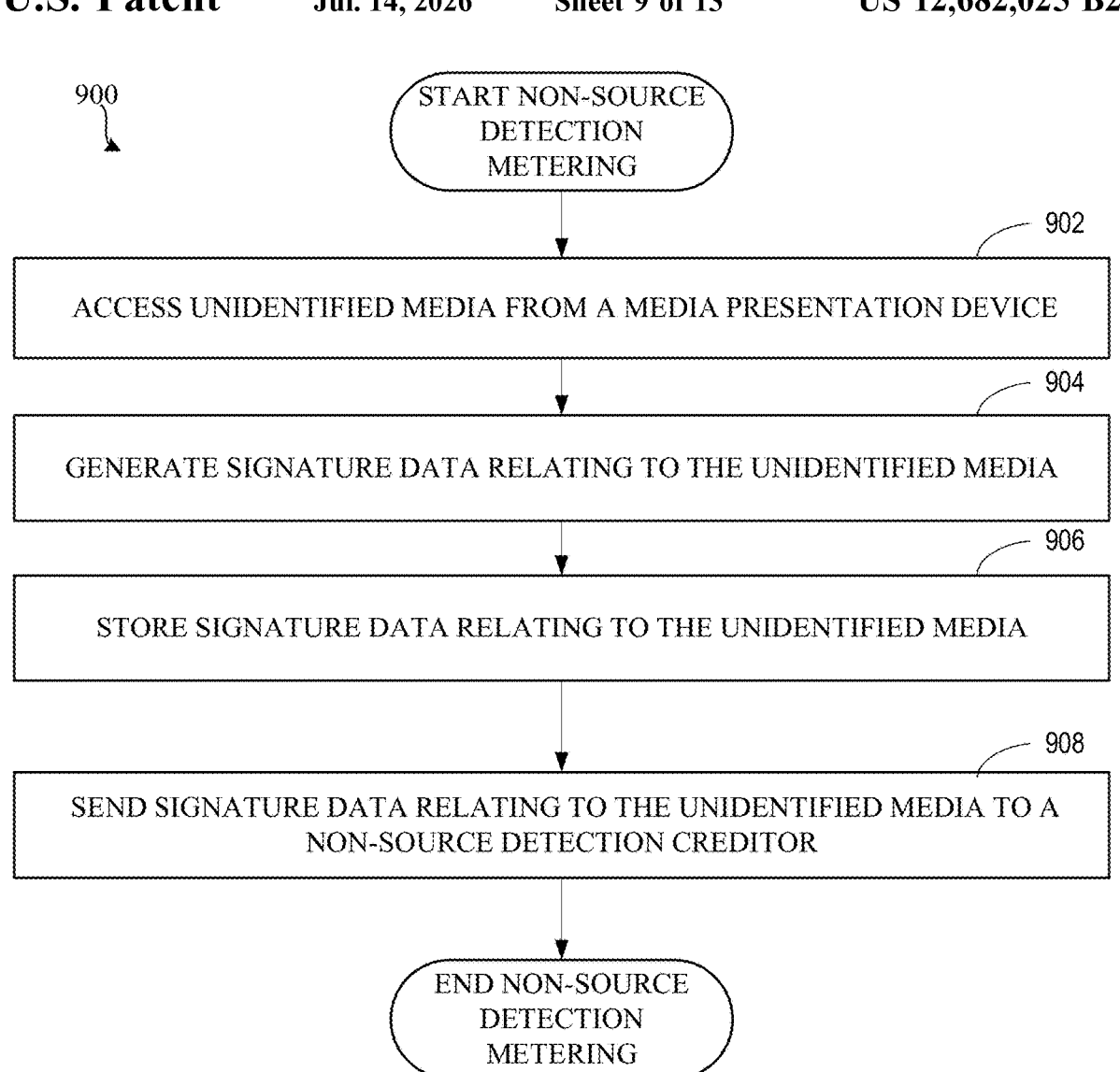
FIG. 9 is a flowchart representative of example machine readable instructions which may be executed to implement the non-source detection meter of FIG. 2.

FIG. 9 is a flowchart representative of machine readable instructions 900 which may be executed to implement the non-source detection meter 214 of FIG. 2. At block 902, the example non-source detection meter 214 accesses the unidentified media from a media presentation device 208. For example, the example non-source detection meter 214 may access the unidentified media from a media presentation device 208 by recording media on a television that is tuned to a station that broadcasts non-encoded, non-water-marked media.

The example non-source detection meter 214 generates monitored signature data relating to the unidentified media (block 904). For example, the example non-source detection meter 214 may generate monitored signature data relating to the unidentified media by generating media crediting data (e.g., media crediting data 650 of FIG. 6B).

The example non-source detection meter 214 stores the monitored signature data relating to the unidentified media (block 906). For example, the example non-source detection meter 214 may store the monitored signature data relating to the unidentified media by saving the media crediting data to internal memory.

The example non-source detection meter 214 sends the signature data relating to the unidentified media to a non-source detection creditor 304 (block 908). For example, the example non-source detection meter 214 may send the monitored signature data relating to the unidentified media to a non-source detection creditor 304 by transferring the media crediting data (e.g., media crediting data 650 of FIG. 6B) to the source detection creditor 304 of the audience measurement service 190. The instructions 900 end.

Figure 10:
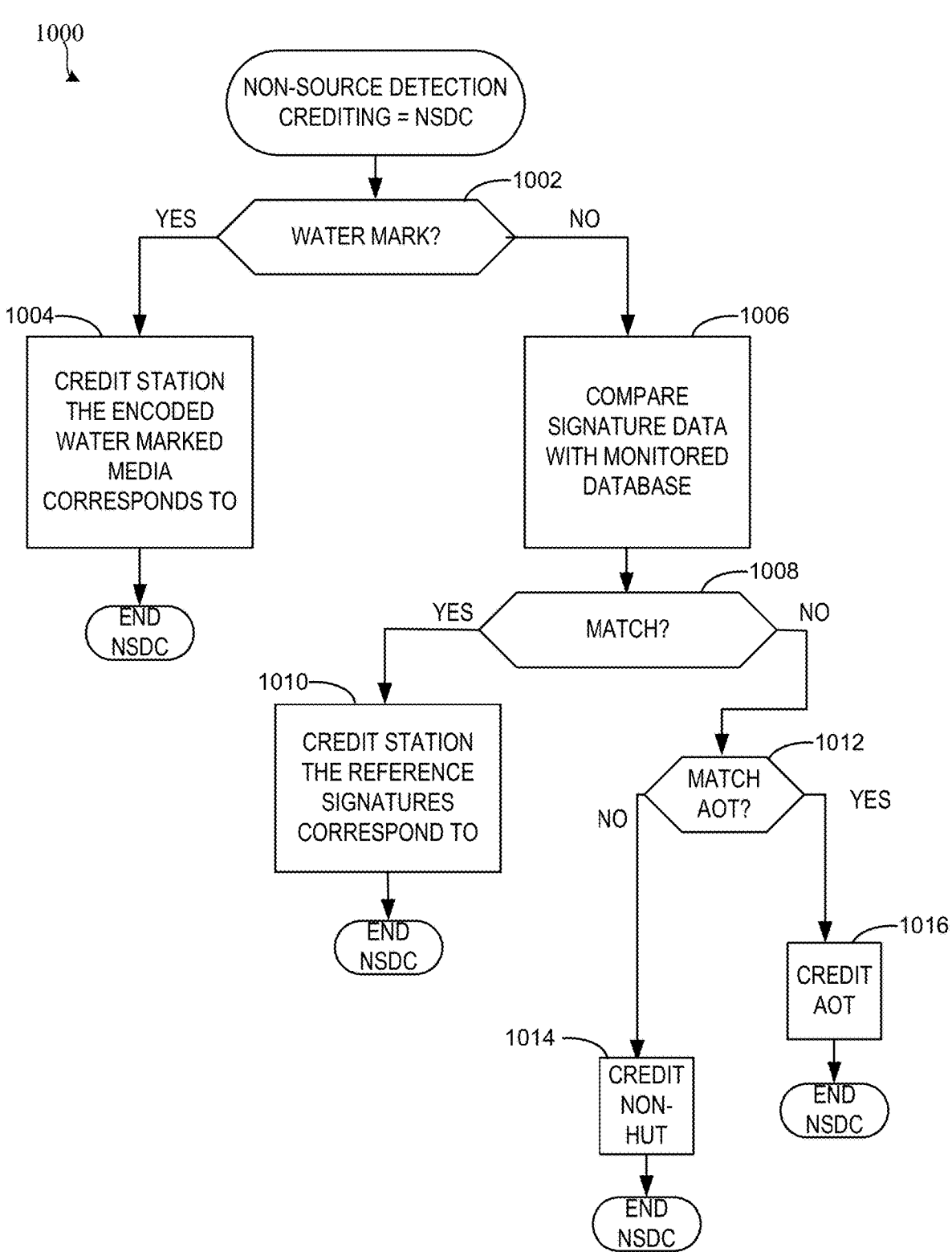
FIG. 10 is a flowchart representative of example machine readable instructions which may be executed to implement the non-source detection creditor of FIG. 2.

FIG. 10 is a flowchart representative of machine readable instructions 1000 which may be executed to implement the non-source detection creditor 304 of FIG. 2. At block 1002, the example non-source detection creditor 304 determines if the media crediting data (e.g., media crediting data 650 of FIG. 6B or media crediting data 660 of FIG. 6C, the linked source information and signature data relating to the unidentified media, etc.) includes watermarks. If the example non-source detection creditor 304 determines the media crediting data does include watermarks for a particular database entry (e.g., fourth entry 620 of FIG. 6C), control flows to block 1004.

At block 1004, the example non-source detection creditor 304 credits the station the encoded, watermarked media corresponds to. The instructions 1000 end.

If the example non-source detection creditor 304 determines the media crediting data does not include watermarks for a particular database entry (e.g., second entry 616 of FIG. 6C), control flows to block 1006.

At block 1006, the example non-source detection creditor 304 compares the monitored signature data of the particular database entry with reference signature data in the reference signature database 306.

After the comparison, control flows to block 1008, wherein the example non-source detection creditor 304 determines if the monitored signature data of the database entry matches reference signature data in the reference signature database 306. If the example non-source detection creditor 304 determines the monitored signature data matches the reference signature data in the reference signature database 306, control flows to block 1010.

At block 1010, the example non-source detection creditor 304 credits the television station the reference signatures correspond to. For example, a media provider (e.g., a television station) may provide media to be monitored to the example audience measurement service 190, where the example audience measurement service 190 generates signature data corresponding to the media to be monitored. The generated signature data (e.g., reference signature data) which is linked to a specific media provider (e.g., television station) is stored in the reference signature database 306, and if monitored signature data from the media crediting data matches reference signature data in the reference signature database 306, the specific media provider is credited. If the example non-source detection creditor 304 determines there was not a match with the reference signature database 306, control flows to block 1012.

At block 1012, the example non-source detection creditor 304 determines if the monitored signature data of the database entry matches monitored signature data in the example AOT monitored signature database 308. For example, the example AOT monitored signature database 308 includes monitored signature data that is associated with a first type of source (e.g., an over-the-air antenna, a cable set top box, a satellite set top box, etc.). The monitored signature data that is associated with the first type of source is assumed to be television data (HUT), and because the specific television station is unknown, the media the monitored signature data represents is credited (e.g., classified) as AOT (All-Other-Tuning). If monitored signatures from a non-source detection meter match monitored signatures in the example AOT monitored signature database 308, then the signatures from the non-source detection meter, which under some prior techniques would not be credited (e.g., classified) as AOT, are credited (e.g., classified) as AOT.

If the example non-source detection creditor 304 determines the monitored signature data of the database entry does not match monitored signature data in the example AOT monitored signature database 308, control flows to block 1014. At block 1014, the example non-source detection creditor 304 credits the media corresponding to the monitored signatures as Non-HUT. For example, the third entry 618 of FIG. 6C is not already in the AOT reference signature database, and there is no source, so the audience measurement service 190 credits the monitored signatures as Non-HUT. In some examples, the audience measurement service 190 discards the monitored signatures and does not save (e.g., store) the monitored signatures in a Non-HUT database. The example instructions 1000 end.

If the example non-source detection creditor 304 determines the monitored signature data of the database entry does match monitored signature data in the AOT monitored signature database 308, control flows to block 1016. At block 1016, the example source detection creditor 302 credits (e.g., classifies) the media the monitored signatures correspond to as AOT (which is a subset of HUT). The example instructions 1000 end.

FIG. 11 is a flowchart representative of machine readable instructions which may be executed to implement the example audience measurement service of FIG. 2 to utilize source detection meters and non-source detection meters to credit unknown media feeds. At block 1102, the example audience measurement service 190 stores a first group of signatures representative of unidentified media in a first database, the first group of signatures obtained from a first media meter that is to monitor a first media presentation device, the first group of signatures associated with a first media exposure category based on media source information associated with the first group of signatures, the media source information reported by the first media meter (block 1102).

The example audience measurement service 190 may store a first group of signatures representative of unidentified media in a first database, the first group of signatures obtained from a first media meter that is to monitor a first media presentation device, the first group of signatures associated with a first media exposure category based on media source information associated with the first group of signatures, the media source information reported by the first media meter by using the example database updater 312 to update the example AOT monitored signature database 308 after determining the media source is a first type of media source (e.g., an over-the-air antenna, a cable set top box, a satellite set top box, etc.) and that the first group of signatures are not represented in the example reference signature database 306. The example audience measurement service 190 may use the example source detection creditor 302 to compare the signatures with the signatures in the example reference signature database 306. Control flows to block 1104.

At block 1104, the example audience measurement service 190 compare a second group of signatures with the first group of signatures, the second group of signatures obtained from a second media meter that is to monitor a second media presentation device (block 1104). For example, the audience measurement service 190 may compare a second group of signatures with the first group of signatures, the second group of signatures obtained from a second media meter that is to monitor a second media presentation device by using the example AOT comparator 402 of the example non-source detection creditor 304 to compare the second group of signatures obtained from the non-source detection meters with the first group of signatures which are stored in the example AOT monitored signature database 308 and associated with a first type of source. Control flows to block 1106.

At block 1106, the example audience measurement service 190 credits media exposure represented by the second group of signatures to the first media exposure category in response to a determination that the second group of signatures matches the first group of signatures (block 1106). For example, the example audience measurement service 190 may credit media exposure represented by the second group of signatures to the first media exposure category in response to a determination that the second group of signatures matches the first group of signatures by using the example reporter 310 to classify the signatures as AOT which is a subset of HUT. The example instructions 1100 end.

Figure 12:
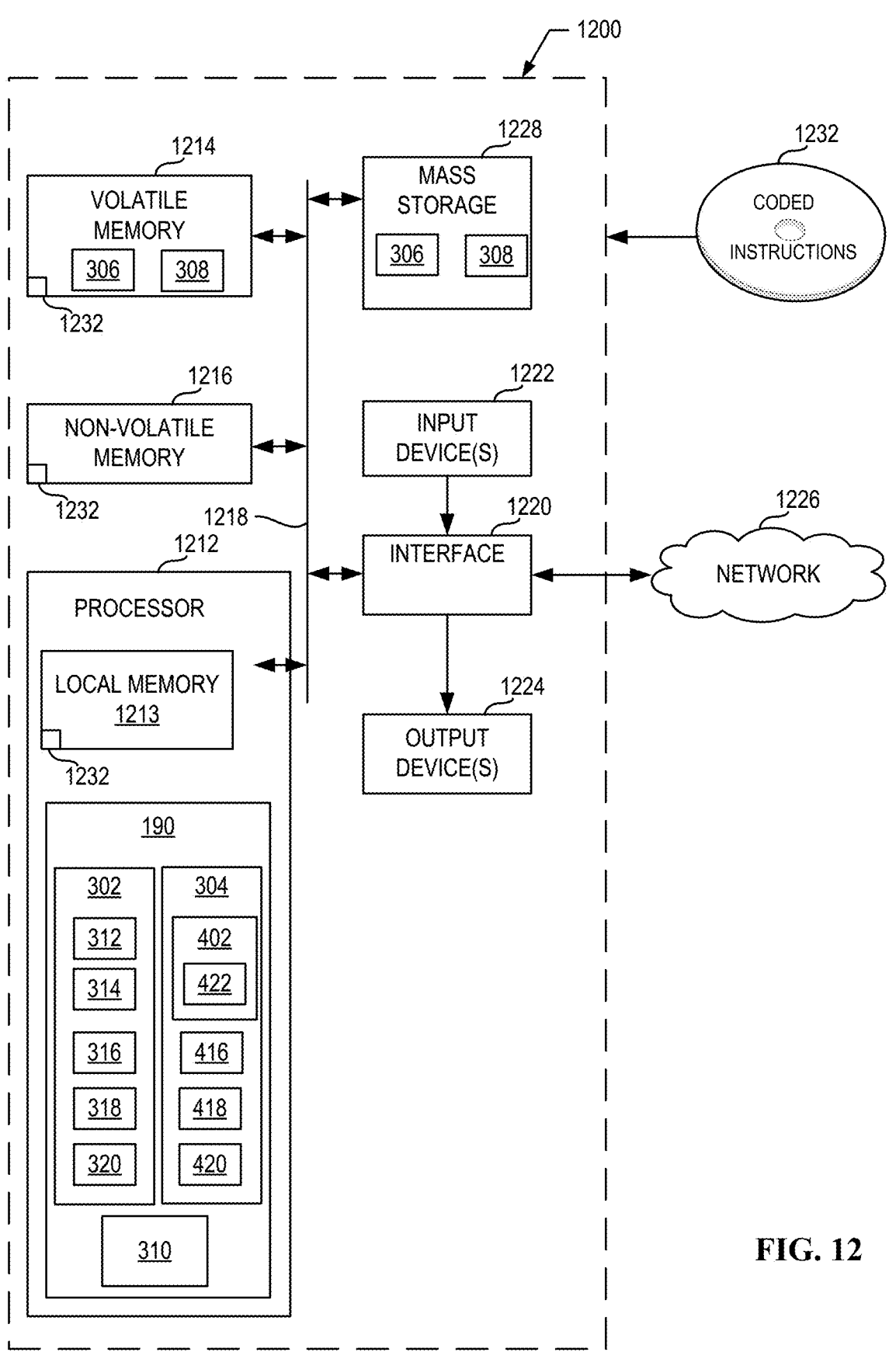
FIG. 12 is a block diagram of an example processing platform structured to execute the instructions of FIG. 11 to implement the example audience measurement service of FIG. 2.

FIG. 12 is a block diagram of an example processor platform 1200 structured to execute the instructions of FIGS. 7-11 to implement the audience measurement service 190 of FIGS. 1-5. The processor platform 1200 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 1200 of the illustrated example includes a processor 1212. The processor 1212 of the illustrated example is hardware. For example, the processor 1212 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the audience measurement service 190, the source detection creditor 302, the non-source detection creditor 304, the database updater 312, the source identifier 314, the watermark identifier 316, the comparator 318, the monitored media identifier 320, the AOT comparator 402, the temporal offset manager 422, the watermark identifier 416, the comparator 418, the monitored media identifier 420 and the reporter 310.

The processor 1212 of the illustrated example includes a local memory 1213 (e.g., a cache). The processor 1212 of the illustrated example is in communication with a main memory including a volatile memory 1214 and a non-volatile memory 1216 via a bus 1218. The volatile memory 1214 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1216 may be implemented by flash memory and/or any other desired type of memory device. Access to the main memory 1214, 1216 is controlled by a memory controller.

The processor platform 1200 of the illustrated example also includes an interface circuit 1220. The interface circuit 1220 may be implemented by any type of interface standard, such as an Ethernet interface, a universal serial bus (USB), a Bluetooth® interface, a near field communication (NFC) interface, and/or a PCI express interface.

In the illustrated example, one or more input devices 1222 are connected to the interface circuit 1220. The input device(s) 1222 permit(s) a user to enter data and/or commands into the processor 1212. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1224 are also connected to the interface circuit 1220 of the illustrated example. The output devices 1224 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1220 of the illustrated example, thus, typically includes a graphics driver card, a graphics driver chip and/or a graphics driver processor.

The interface circuit 1220 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1226. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1200 of the illustrated example also includes one or more mass storage devices 1228 for storing software and/or data. Examples of such mass storage devices 1228 include floppy disk drives, hard drive disks, compact disk drives, Blu-ray disk drives, redundant array of independent disks (RAID) systems, and digital versatile disk (DVD) drives. The reference signature database 306 and the example AOT monitored signature database 308 are stored in the mass storage 1228 and/or the volatile memory 1214.

The machine executable instructions 1232 of FIGS. 7-11 may be stored in the mass storage device 1228, in the volatile memory 1214, in the non-volatile memory 1216, and/or on a removable non-transitory computer readable storage medium such as a CD or DVD.

Figure 13:
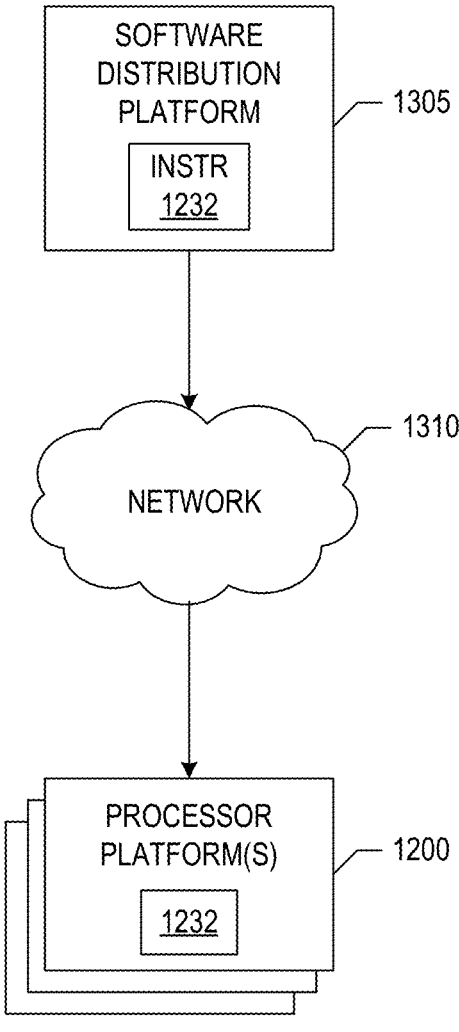
FIG. 13 is a block diagram of an example software distribution platform (e.g., one or more servers) to distribute software (e.g., software corresponding to the example machine readable instructions of FIGS. 7-11) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1305 to distribute software such as the example machine readable instructions 1232 of FIG. 12 to hardware devices owned and/or operated by third parties is illustrated in FIG. 13. The example software distribution platform 1305 may be implemented by any computer server, data facility, cloud service, etc., capable of storing and transmitting software to other computing devices. The third parties may be customers of the entity owning and/or operating the software distribution platform 1305. For example, the entity that owns and/or operates the software distribution platform 1305 may be a developer, a seller, and/or a licensor of software such as the example machine readable instructions 1232 of FIG. 12. The third parties may be consumers, users, retailers, OEMs, etc., who purchase and/or license the software for use and/or re-sale and/or sub-licensing. In the illustrated example, the software distribution platform 1305 includes one or more servers and one or more storage devices. The storage devices store the machine readable instructions 1232, which may correspond to the example machine readable instructions 700, 800, 900, 1000, and 1100 of FIGS. 7-11, as described above. The one or more servers of the example software distribution platform 1305 are in communication with a network 1310, which may correspond to any one or more of the Internet and/or any of the example networks 1226 described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 1232 from the software distribution platform 1305. For example, the software, which may correspond to the example machine readable instructions 1232 of FIG. 12, may be downloaded to the example processor platform 1200, which is to execute the machine readable instructions 1232 to implement the audience measurement service 190. In some example, one or more servers of the software distribution platform 1305 periodically offer, transmit, and/ or force updates to the software (e.g., the example machine readable instructions 1232 of FIG. 12) to ensure improvements, patches, updates, etc., are distributed and applied to the software at the end user devices.

From the foregoing, it will be appreciated that example methods, apparatus and articles of manufacture have been disclosed that credit unidentified media. The disclosed methods, apparatus and articles of manufacture improve the efficiency of using a computing device by reducing erroneous crediting of monitored media as Non-HUT when AOT (which is a subset of HUT) should be credited, thereby improving consistency across crediting of media. The disclosed methods, apparatus and articles of manufacture are accordingly directed to one or more improvement(s) in the functioning of a computer.

Example methods, apparatus, systems, and articles of manufacture to credit unidentified media are disclosed herein. Further examples and combinations thereof include the following:

Example 1 includes an apparatus to credit unidentified media, the apparatus comprising a database updater to store a first group of signatures representative of unidentified media in a first database, the first group of signatures obtained from a first media meter that is to monitor a first media presentation device, the first group of signatures associated with a first media exposure category based on media source information associated with the first group of signatures, the media source information reported by the first media meter, a media comparator to compare a second group of signatures with the first group of signatures, the second group of signatures obtained from a second media meter that is to monitor a second media presentation device, and a reporter to credit media exposure represented by the second group of signatures to the first media exposure category in response to a determination that the second group of signatures matches the first group of signatures.

Example 2 includes the apparatus of example 1, wherein the media source information is to indicate a media source associated with the first group of signatures is at least one of an over-the-air antenna, a cable set top box, a satellite set top box or a tuner of the first media presentation device.

Example 3 includes the apparatus of example 2, further including a source detection creditor to classify the first group of signatures in the first media exposure category based on the media source information, the first media exposure category to represent linear television broadcasts for which a television channel is unknown.

Example 4 includes the apparatus of example 3, wherein the unidentified media does not include encoded watermarks.

Example 5 includes the apparatus of example 3, wherein the database updater is to store the first group of signatures in the first database in response to (i) a determination that the first group of signatures do not match reference signatures representative of monitored television stations and (ii) the media source information indicates the first group of signatures are associated with a first type of source that provides access to linear television feeds.

Example 6 includes the apparatus of example 1, wherein the media source information indicates at least one of a Digital Video Disc (DVD) player or a video game console is associated with the first group of signatures, and the reporter is not to credit media exposure for the unidentified media.

Example 7 includes the apparatus of example 1, wherein the first media meter is to perform source detection and the second media meter does not perform source detection.

Example 8 includes the apparatus of example 7, further including a first creditor to receive source detection media crediting data from the first media meter structured to perform source detection, wherein the first database includes signatures that do not match reference signatures, and are associated with a first type of source.

Example 9 includes an apparatus comprising a non-transitory computer readable medium, instructions at the apparatus, a logic circuit to execute the instructions to at least store a first group of signatures representative of unidentified media in a first database, the first group of signatures obtained from a first media meter that is to monitor a first media presentation device, the first group of signatures associated with a first media exposure category based on media source information associated with the first group of signatures, the media source information reported by the first media meter, compare a second group of signatures with the first group of signatures, the second group of signatures obtained from a second media meter that is to monitor a second media presentation device, and credit media exposure represented by the second group of signatures to the first media exposure category in response to a determination that the second group of signatures matches the first group of signatures.

Example 10 includes the non-transitory computer readable medium of example 9, wherein the media source information is to indicate a media source associated with the first group of signatures is at least one of an over-the-air antenna, a cable set top box, a satellite set top box or a tuner of the first media presentation device.

Example 11 includes the non-transitory computer readable medium of example 10, wherein the instructions, when executed, further cause the logic circuit to classify the first group of signatures in the first media exposure category based on the media source information, the first media exposure category to represent linear television broadcasts for which a television channel is unknown.

Example 12 includes the non-transitory computer readable medium of example 11, wherein the unidentified media does not include encoded watermarks.

Example 13 includes the non-transitory computer readable medium of example 11, wherein the instructions, when executed further cause the logic circuit to store the first group of signatures in the first database in response to (i) a determination that the first group of signatures do not match reference signatures representative of monitored television stations and (ii) the media source information indicates the first group of signatures are associated with a first type of source that provides access to linear television feeds.

Example 14 includes the non-transitory computer readable medium of example 9, wherein the media source information indicates at least one of a Digital Video Disc (DVD) player or a video game console is associated with the first group of signatures, and the reporter is not to credit media exposure for the unidentified media.

Example 15 includes the non-transitory computer readable medium of example 9, wherein the first media meter is to perform source detection and the second media meter does not perform source detection.

Example 16 includes the non-transitory computer readable medium of example 15, wherein the instructions, when executed further cause the logic circuit to receive source detection media crediting data from the first media meter structured to perform source detection, wherein the first database includes signatures that do not match reference signatures, and are associated with a first type of source.

Example 17 includes a method to credit unidentified media, the method comprising storing a first group of signatures representative of unidentified media in a first database, the first group of signatures obtained from a first media meter that is to monitor a first media presentation device, the first group of signatures associated with a first media exposure category based on media source information associated with the first group of signatures, the media source information reported by the first media meter, comparing a second group of signatures with the first group of signatures, the second group of signatures obtained from a second media meter that is to monitor a second media presentation device, and crediting media exposure represented by the second group of signatures to the first media exposure category in response to a determination that the second group of signatures matches the first group of signatures.

Example 18 includes the method of example 17, wherein the media source information is to indicate a media source associated with the first group of signatures is at least one of an over-the-air antenna, a cable set top box, a satellite set top box or a tuner of the first media presentation device.

Example 19 includes the method of example 18, wherein the method further includes classifying the first group of signatures in the first media exposure category based on the media source information, the first media exposure category to represent linear television broadcasts for which a television channel is unknown.

Example 20 includes the method of example 19, wherein the unidentified media does not include encoded watermarks.

Example 21 includes the method of example 19, wherein the method further includes storing the first group of signatures in the first database in response to (i) a determination that the first group of signatures do not match reference signatures representative of monitored television stations and (ii) the media source information indicates the first group of signatures are associated with a first type of source that provides access to linear television feeds.

Example 22 includes the method of example 17, wherein the media source information indicates at least one of a Digital Video Disc (DVD) player or a video game console is associated with the first group of signatures, and the reporter is not to credit media exposure for the unidentified media.

Example 23 includes the method of example 17, wherein the first media meter is to perform source detection and the second media meter does not perform source detection.

Example 24 includes the method of example 23, wherein the method further includes receiving source detection media crediting data from the first media meter structured to perform source detection, wherein the first database includes signatures that do not match reference signatures, and are associated with a first type of source.

Example 25 includes an apparatus comprising at least one memory, instructions in the apparatus, and processor circuitry including control circuitry to control data movement within the processor circuitry, arithmetic and logic circuitry, to perform one or more operations on the data, and one or more registers to store a result of one or more operations, the processor circuitry to execute the instructions to store a first group of signatures representative of unidentified media in a first database, the first group of signatures obtained from a first media meter that is to monitor a first media presentation device, the first group of signatures associated with a first media exposure category based on media source information associated with the first group of signatures, the media source information reported by the first media meter, compare a second group of signatures with the first group of signatures, the second group of signatures obtained from a second media meter that is to monitor a second media presentation device, and credit media exposure represented by the second group of signatures to the first media exposure category in response to a determination that the second group of signatures matches the first group of signatures.

Example 26 includes the apparatus of example 25, wherein the media source information is to indicate a media source associated with the first group of signatures is at least one of an over-the-air antenna, a cable set top box, a satellite set top box or a tuner of the first media presentation device.

Example 27 includes the apparatus of example 26, wherein the processor circuitry further executes the instructions to classify the first group of signatures in the first media exposure category based on the media source information, the first media exposure category to represent linear television broadcasts for which a television channel is unknown.

Example 28 includes the apparatus of example 27, wherein the unidentified media does not include encoded watermarks.

Example 29 includes the apparatus of example 27, wherein the processor circuitry further executes the instructions to store the first group of signatures in the first database in response to (i) a determination that the first group of signatures do not match reference signatures representative of monitored television stations and (ii) the media source information indicates the first group of signatures are associated with a first type of source that provides access to linear television feeds.

Example 30 includes the apparatus of example 25, wherein the media source information indicates at least one of a Digital Video Disc (DVD) player or a video game console is associated with the first group of signatures, and the reporter is not to credit media exposure for the unidentified media.

Example 31 includes the apparatus of example 25, wherein the first media meter is to perform source detection and the second media meter does not perform source detection.

Example 32 includes the apparatus of example of 31, wherein the processor circuitry further executes the instructions to receive source detection media crediting data from the first media meter structured to perform source detection, wherein the first database includes signatures that do not match reference signatures, and are associated with a first type of source.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. A non-transitory computer readable medium having stored therein instructions that, when executed by at least one processor, cause performance of operations comprising:

obtaining, from a first meter associated with a first media presentation device, a first group of signatures associated with media source information reported by the first meter, the first group of signatures indicative of output by the first media presentation device during a first time interval;

classifying the first group of signatures in a linear television broadcast media exposure category based on the media source information;

based on classifying the first group of signatures in the linear television broadcast media exposure category, crediting a first audience associated with the first meter with media exposure in the linear television broadcast media exposure category during the first time interval;

storing, in a first database, the first group of signatures in association with the linear television broadcast media exposure category;

obtaining, from a second meter associated with a second media presentation device, a second group of signatures, the second group of signatures indicative of output by the second media presentation device during a second time interval;

determining that the second group of signatures matches the first group of signatures; and in response to determining that the second group of signatures matches the first group of signatures, crediting a second audience associated with the second meter with media exposure in the linear television broadcast media exposure category during the second time interval.

2. The non-transitory computer readable medium of claim 1, wherein the media source information indicates a media source of the first media presentation device during the first time interval is at least one of an over-the-air antenna, a cable set top box, a satellite set top box, or a tuner of the first media presentation device.

3. The non-transitory computer readable medium of claim 1, wherein the operations further include obtaining, from the first meter, an indication that the first meter failed to extract an encoded watermark based on the output of the first media presentation device during the first time interval.

4. The non-transitory computer readable medium of claim 1, wherein the operations further include storing the first group of signatures in the first database in response to determining that the first group of signatures do not match reference signatures representative of monitored television stations.

5. The non-transitory computer readable medium of claim 1, wherein the first meter is configured to perform source detection and the second meter is not configured to perform source detection.

6. The non-transitory computer readable medium of claim 1, wherein the linear television broadcast media exposure category represents linear television broadcasts for at least one unrecognized television channel.

7. The non-transitory computer readable medium of claim 1, wherein the linear television broadcast media exposure category represents linear television broadcasts distributed via one or more of streaming, broadcast, and cable, and wherein the first media presentation device presents streaming media during the first time interval.

8. An audience measurement computing system comprising:

at least one processor;

memory having stored therein computer readable instructions that, when executed by the at least one processor, cause the audience measurement computing system to perform operations comprising:

obtaining, from a first meter associated with a first media presentation device, a first group of signatures associated with media source information reported by the first meter, the first group of signatures indicative of output by the first media presentation device during a first time interval;

classifying the first group of signatures in a linear television broadcast media exposure category based on the media source information;

based on classifying the first group of signatures in the linear television broadcast media exposure category, crediting a first audience associated with the first meter with media exposure in the linear television broadcast media exposure category during the first time interval;

storing, in a first database, the first group of signatures in association with the linear television broadcast media exposure category;

obtaining, from a second meter associated with a second media presentation device, a second group of signatures, the second group of signatures indicative of output by the second media presentation device during a second time interval;

determining that the second group of signatures matches the first group of signatures; and in response to determining that the second group of signatures matches the first group of signatures, crediting a second audience associated with the second meter with media exposure in the linear television broadcast media exposure category during the second time interval.

9. The audience measurement computing system of claim 8, wherein the media source information indicates a media source of the first media presentation device during the first time interval is at least one of an over-the-air antenna, a cable set top box, a satellite set top box, or a tuner of the first media presentation device.

10. The audience measurement computing system of claim 8, wherein the operations further include obtaining, from the first meter, an indication that the first meter failed to extract an encoded watermark based on the output of the first media presentation device during the first time interval.

11. The audience measurement computing system of claim 8, wherein the operations further include storing the first group of signatures in the first database in response to determining that the first group of signatures do not match reference signatures representative of monitored television stations.

12. The audience measurement computing system of claim 8, wherein the first meter is configured to perform source detection and the second meter is not configured to perform source detection.

13. The audience measurement computing system of claim 8, wherein the linear television broadcast media exposure category represents linear television broadcasts for at least one unrecognized television channel.

14. The audience measurement computing system of claim 8, wherein the linear television broadcast media exposure category represents linear television broadcasts distributed via one or more of streaming, broadcast, and cable, and wherein the first media presentation device presents streaming media during the first time interval.

15. A method for crediting unidentified media, the method comprising:

obtaining, from a first meter associated with a first media presentation device, a first group of signatures associated with media source information reported by the first meter, the first group of signatures indicative of output by the first media presentation device during a first time interval;

classifying the first group of signatures in a linear television broadcast media exposure category based on the media source information;

based on classifying the first group of signatures in the linear television broadcast media exposure category, crediting a first audience associated with the first meter with media exposure in the linear television broadcast media exposure category during the first time interval;

storing, in a first database, the first group of signatures in association with the linear television broadcast media exposure category;

obtaining, from a second meter associated with a second media presentation device, a second group of signatures, the second group of signatures indicative of output by the second media presentation device during a second time interval;

determining that the second group of signatures matches the first group of signatures; and in response to determining that the second group of signatures matches the first group of signatures, crediting a second audience associated with the second meter with media exposure in the linear television broadcast media exposure category during the second time interval.

16. The method of claim 15, wherein the media source information indicates a media source of the first media presentation device during the first time interval is at least one of an over-the-air antenna, a cable set top box, a satellite set top box, or a tuner of the first media presentation device.

17. The method of claim 15, further including obtaining, from the first meter, an indication that the first meter failed to extract an encoded watermark based on the output of the first media presentation device during the first time interval.

18. The method of claim 15, further including storing the first group of signatures in the first database in response to determining that the first group of signatures do not match reference signatures representative of monitored television stations.

19. The method of claim 15, wherein the linear television broadcast media exposure category represents linear television broadcasts for at least one unrecognized television channel.

20. The method of claim 15, wherein the linear television broadcast media exposure category represents linear television broadcasts distributed via one or more of streaming, broadcast, and cable, and wherein the first media presentation device presents streaming media during the first time interval.

* * * * *